(12) United States Patent
Leaver

(10) Patent No.: US 8,408,488 B2
(45) Date of Patent: Apr. 2, 2013

(54) SAFETY FLIER—A PARACHUTE-GLIDER AIR-VEHICLE WITH VERTICAL TAKE-OFF AND LANDING CAPABILITY

(76) Inventor: Glenn Leaver, Summerland (CA)

( * ) Notice: Subject to any disclaimer, the term of this patent is extended or adjusted under 35 U.S.C. 154(b) by 254 days.

(21) Appl. No.: 12/655,546

(22) Filed: Jan. 4, 2010

(65) Prior Publication Data

US 2011/0163198 A1 Jul. 7, 2011

(51) Int. Cl.
*B64C 29/00* (2006.01)
(52) U.S. Cl. .... 244/12.2; 244/4 A; 244/12.5; 244/17.25; 244/69; 244/23 C
(58) Field of Classification Search .................. 244/4 A, 244/12.2, 12.5, 17.23, 23 C, 69
See application file for complete search history.

(56) References Cited

U.S. PATENT DOCUMENTS

| | | | |
|---|---|---|---|
| 2,180,922 | A | 11/1939 | Bothezat |
| 2,847,173 | A | 8/1958 | McCarty |
| 2,953,321 | A * | 9/1960 | Robertson et al. .......... 244/23 C |
| 4,415,131 | A | 11/1983 | Bertelsen |
| 7,281,680 | B2 | 10/2007 | Melkuti |

OTHER PUBLICATIONS

NPL Doc.#1: Leonard G. Cramp "UFO's and Antigravity" (Synopsis) 1996 USA 7pgs. Reference on p. 6.
NPL Doc.#2: HILLER.ORG Hiller Aviation Museum USA, 2012. 3 pgs. Reference on p. 2.
NPL Doc.#3: Wikipedia "Biography of Paul Hill" Apr. 2012, USA, 5 pgs. Reference on p. 3.
NPL Doc.#4: Paul Hill "Unconventional Flying Objects" (Synopsis) 1996 USA, 5pgs. Reference on p. 3.

* cited by examiner

*Primary Examiner* — Tien Dinh
*Assistant Examiner* — Nicholas McFall

(57) ABSTRACT

One embodiment of a Vertical Take-off and Landing (VToL) air-vehicle (FIG. 1.) having a horizontal rotor, a. providing lift and propulsion, and communicating at or near its centre to structural elements, or fuselage, b. Upon or within the fuselage structure is attached a platform, to which a payload, or occupant or pilot, d. is secured in such a manner as to permit a movement, or range-of-motion, of the payload, as a means of weight-shifting, or mass-balancing, of the vehicle for stability and control in flight. At least two planar elements, or descent-vanes, c.i & c.ii are connected to a structural element of the fuselage at a location which provides vertical and horizontal separation between the rotor and the descent-vanes, thus creating a tandem, biplane arrangement of two aerodynamically active elements which are aerodynamically balanced to provide stability and controllability in hovering flight, in forward flight, and in un-powered gliding and vertical descents. Other embodiments are described and shown.

2 Claims, 8 Drawing Sheets

PREFERRED EMBODIMENT IN POWERED FLIGHT

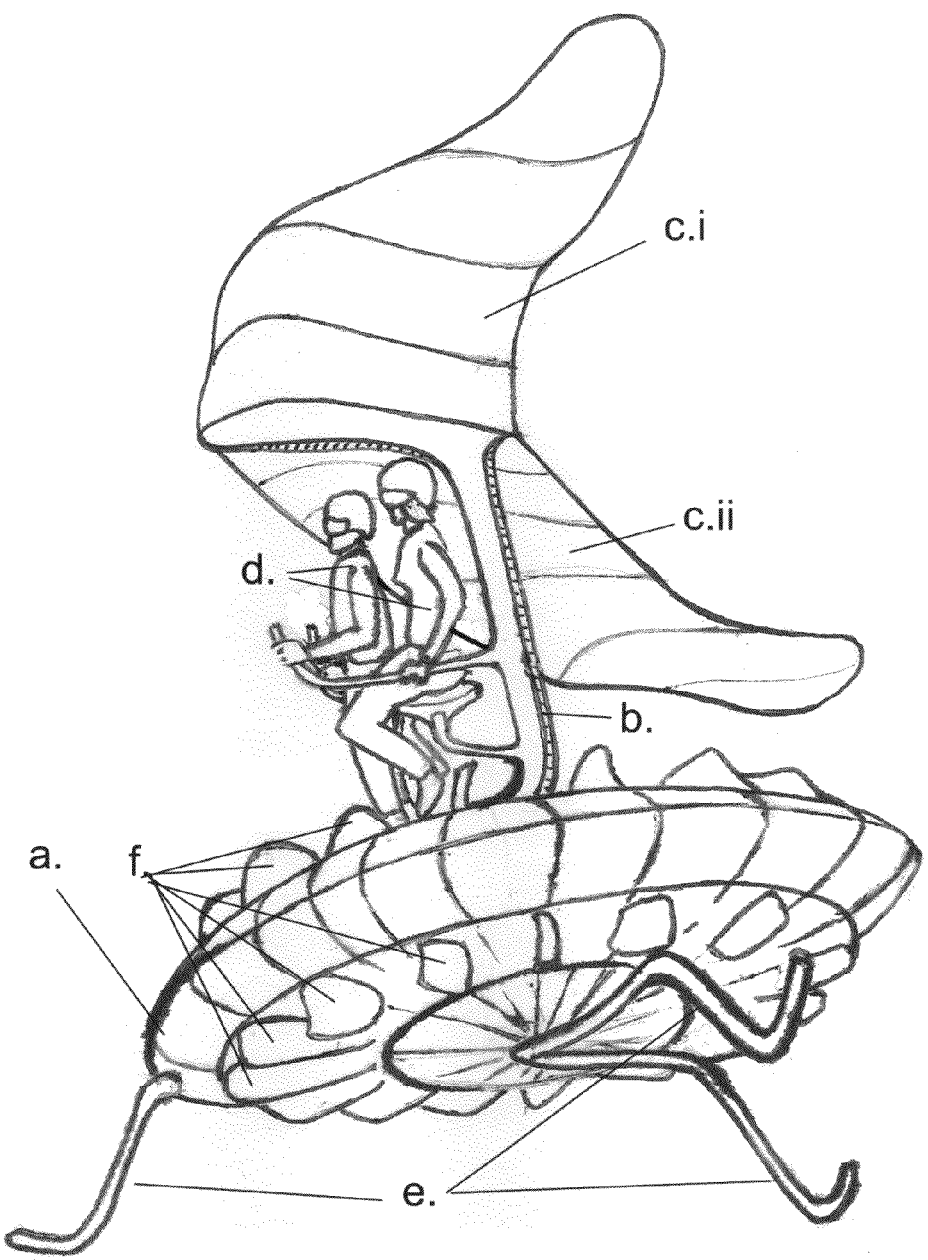
Fig 1. PREFERRED EMBODIMENT IN POWERED FLIGHT

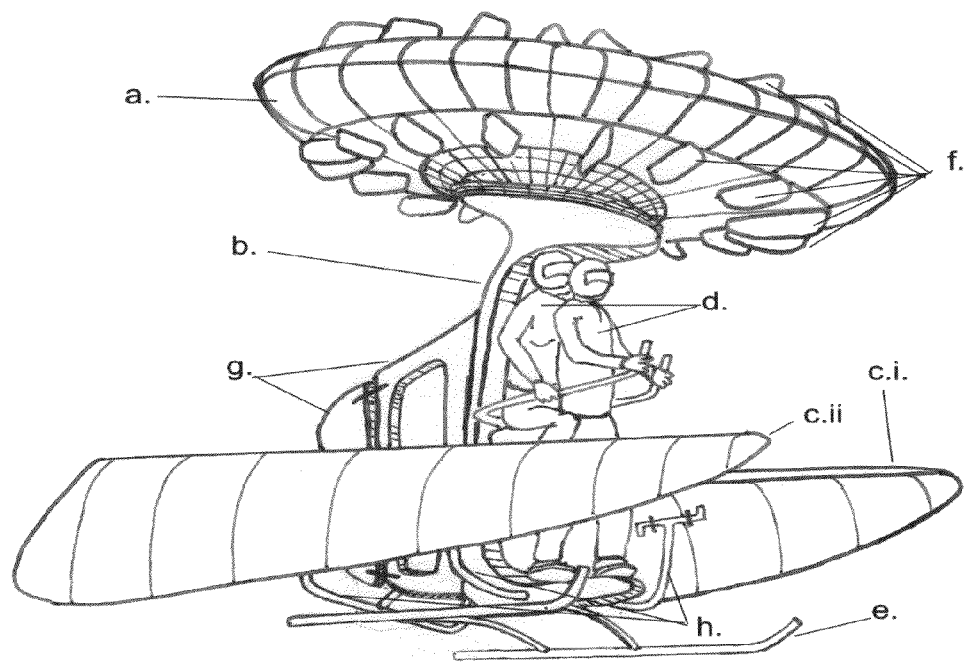
Fig 2.a  Alternate Embodiment in Powered Flight
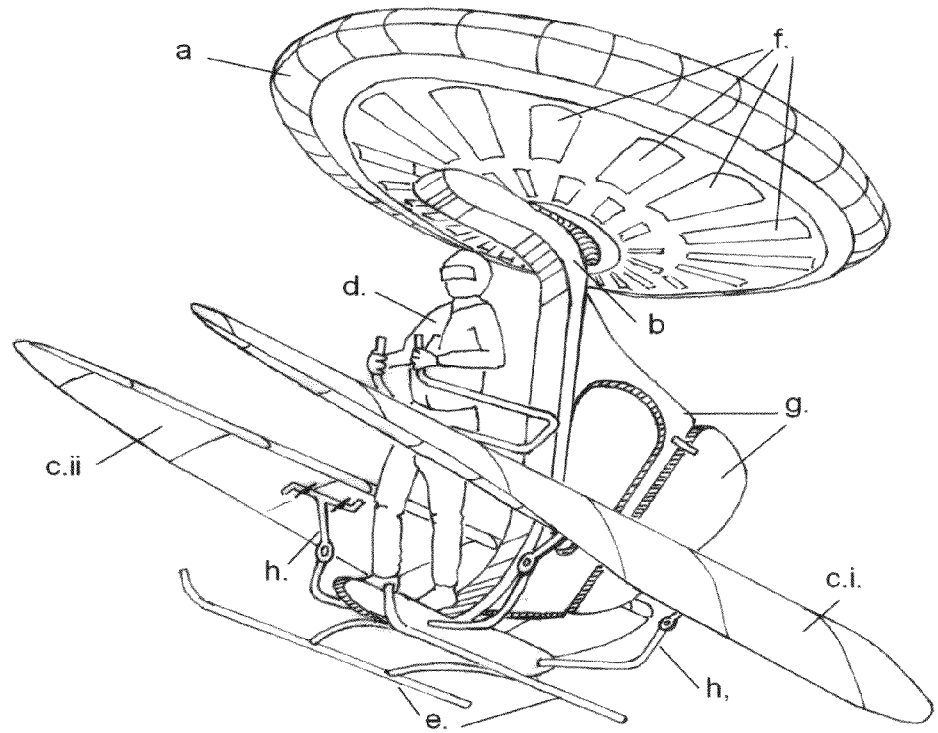
Fig 2.b  Alternate Embodiment in Unpowered Descent

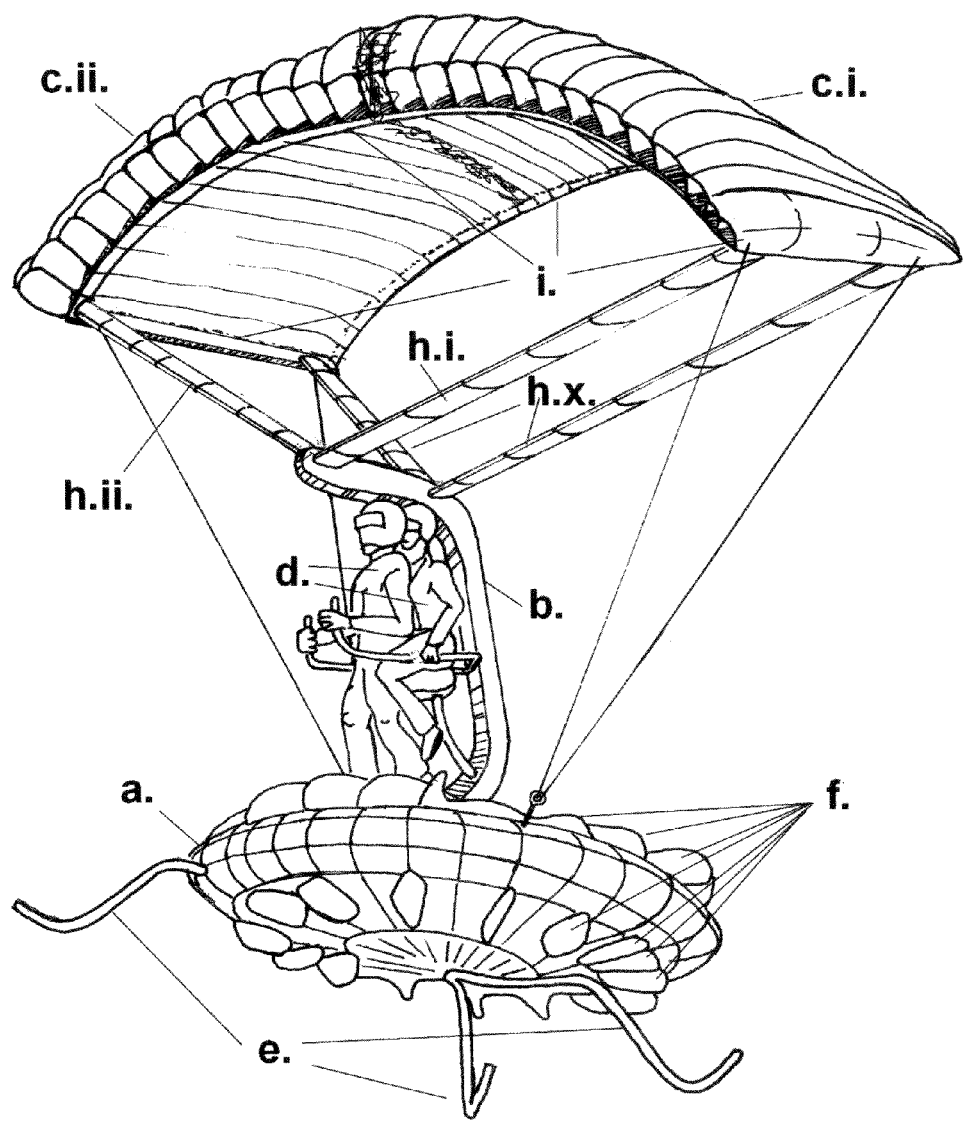
Fig 3. Preferred Embodiment with Semi-Rigid Fabric Descent Vanes

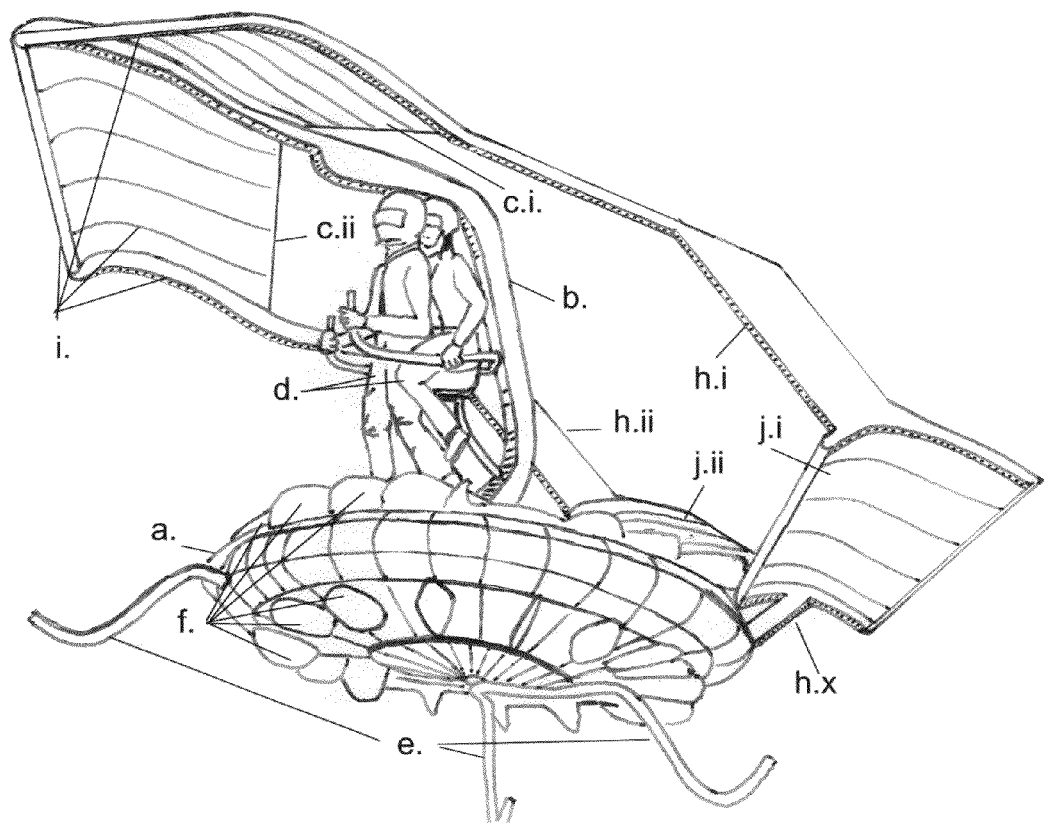
Fig 4. Other Embodiment: HavingTandem, Bi-Vane, Descent-Vanes

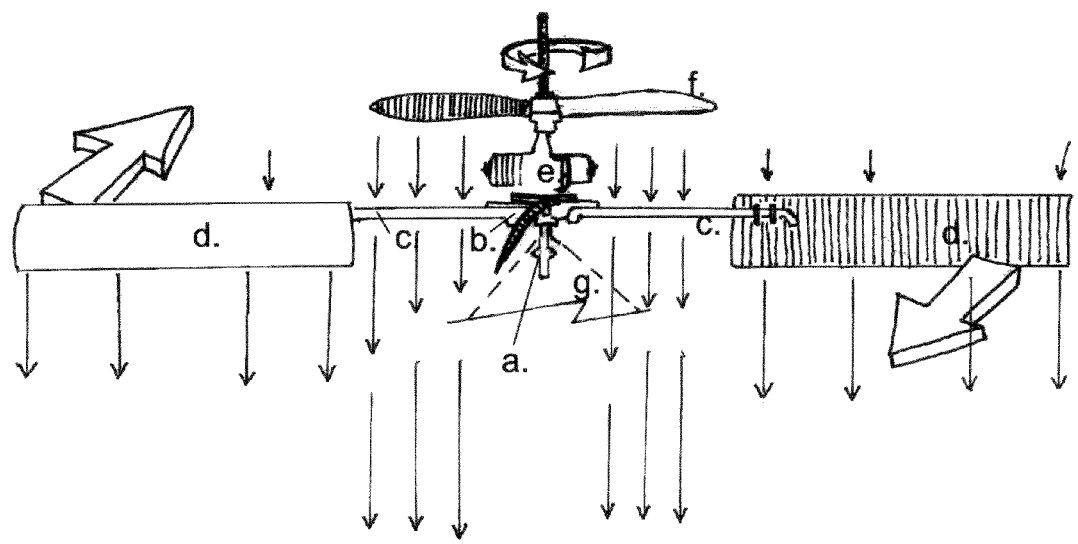
Fig. 5 Prior Art--Torque-Operated Propeller/Rotor
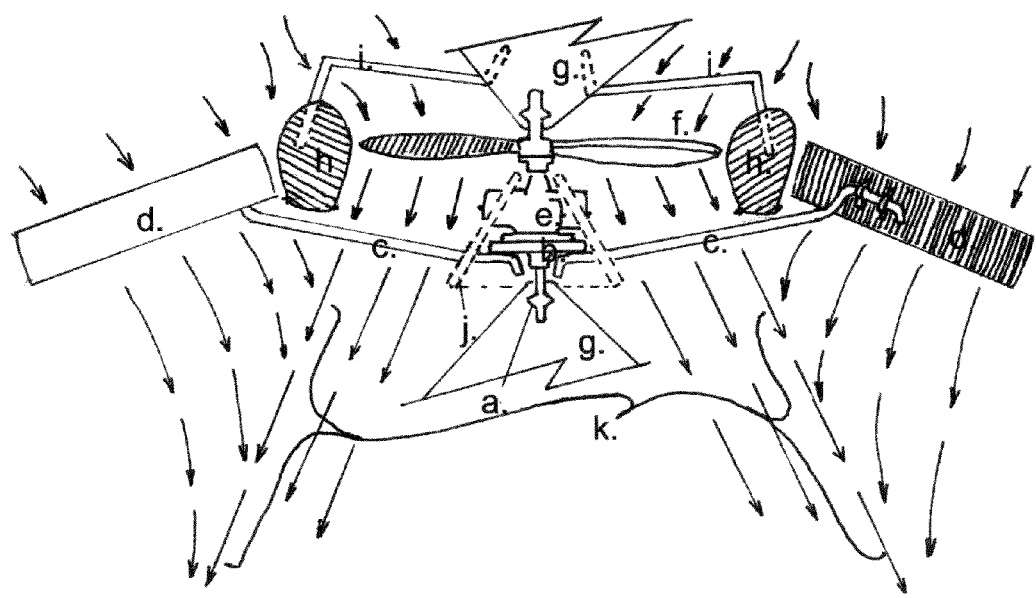
Fig 6 "Dual-Vortex" Propulsion Device

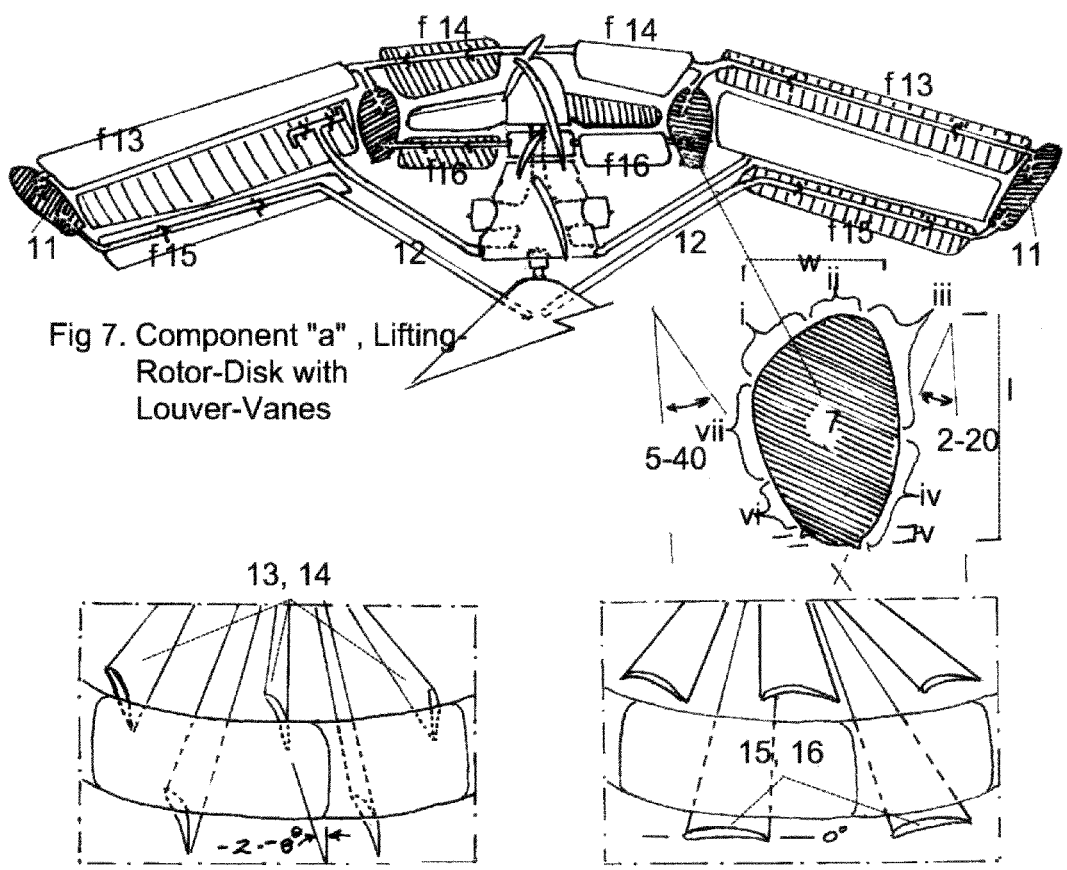
Fig 7. Component "a", Lifting-Rotor-Disk with Louver-Vanes
Fig 8. Louver-Vane, Power-on Position
Fig 9. Louver-Vanes, Descent Position
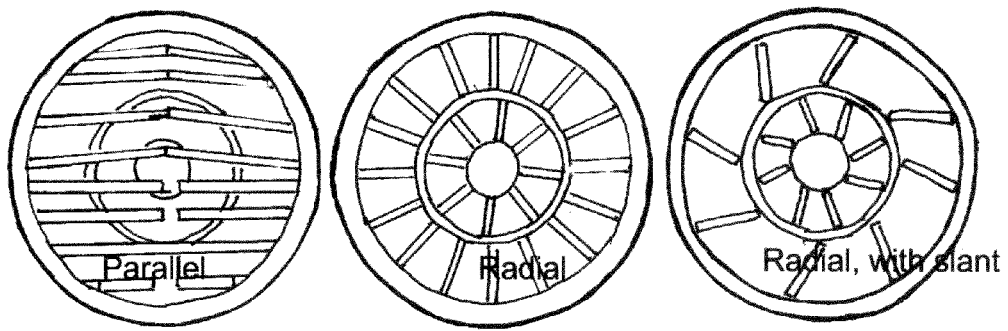
Fig 10. Option Louver-Vane Patterns

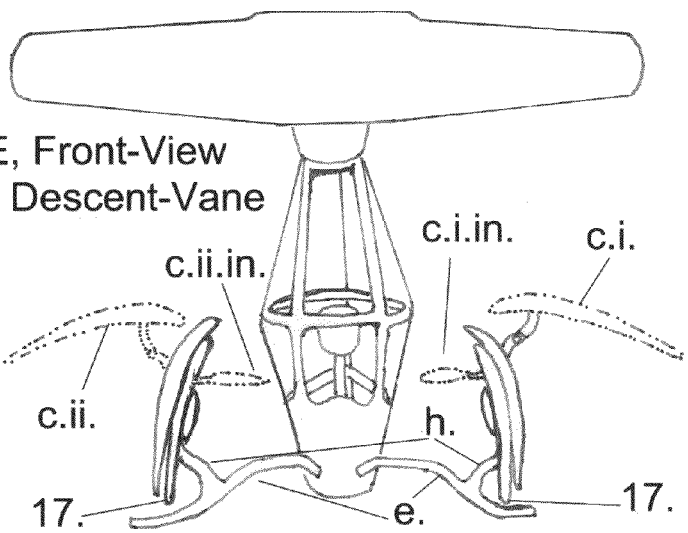
Fig 12. AE, Front-View Showing Descent-Vane Action
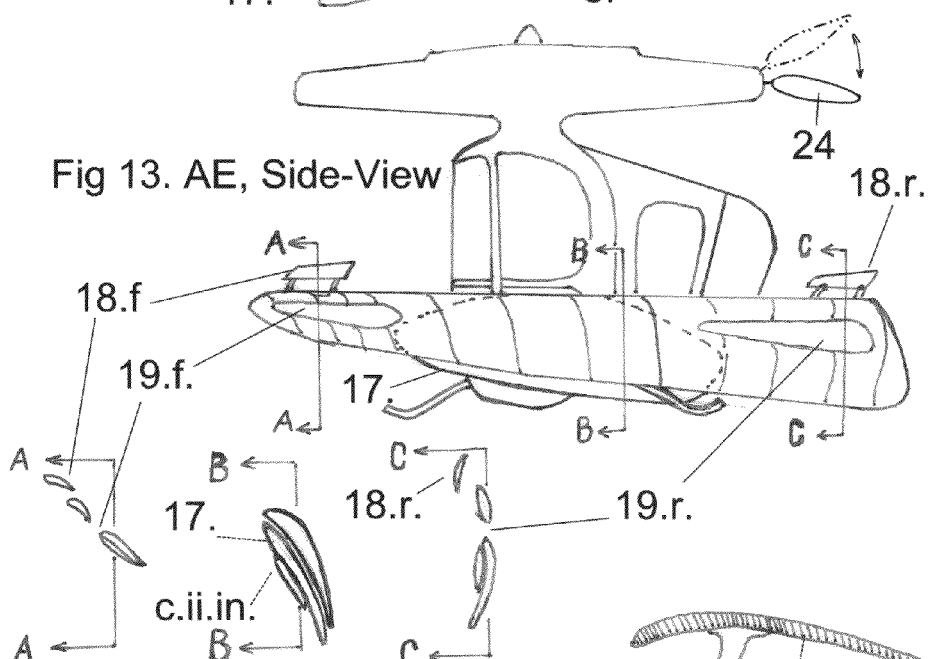
Fig 13. AE, Side-View
Fig 14. AE Descent-Vane Cross-Sections Showing Twist
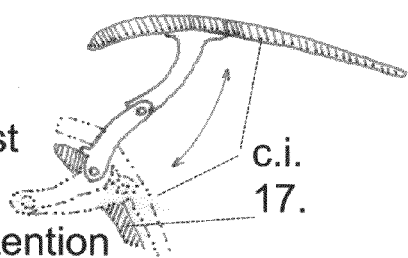
Fig 15. Optional Hinge Extention

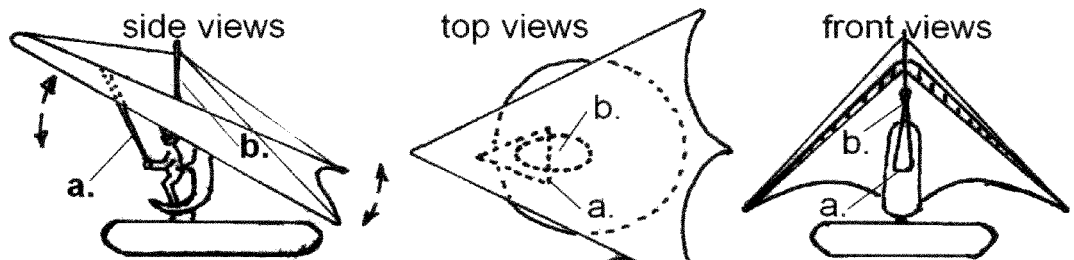
Fig 16. PE, Rogallo
Fig 17. PE, Formed-Panels
Fig 18. PE, "Sport" High-Performance Model
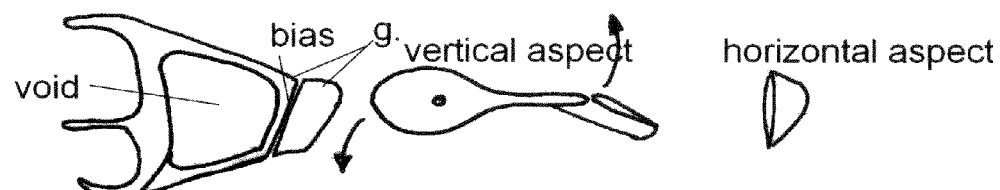
Fig. 19. Alternate Embodiment with Dual-Mode Rudder
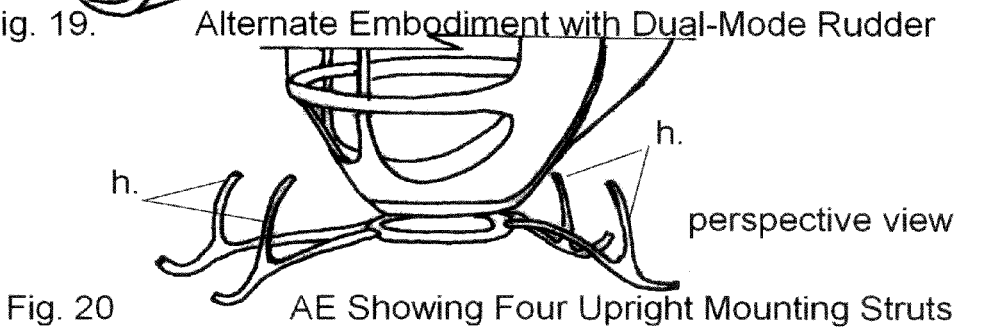
Fig. 20   AE Showing Four Upright Mounting Struts

SAFETY FLIER—A PARACHUTE-GLIDER AIR-VEHICLE WITH VERTICAL TAKE-OFF AND LANDING CAPABILITY

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention relates to powered parachutes, powered gliders, and ultra-light aircraft having Vertical Take-off and Landing (VToL) capability.

2. Background of the Invention

Prior art flying platforms and small helicopters have sought to provide a VToL Personal Flying Vehicle as a practical recreational vehicle, but have not sufficiently satisfied issues of safety—especially regarding engine failure and un-powered descents, and over-complexity of the control system, which render the prior art air vehicles unsuitable for recreational use.

The 'Backyard Flier' Concept:

The phrase "backyard flyer" is used frequently to describe the ideal vehicle, reflecting the desire for one that does not need a runway or special facilities, but can be operated from home. This infers a vehicle of diminutive size—something that might be parked in the driveway, alongside the boat, ATV, and other recreational vehicles. Vertical take-offs are a prerequisite for such a vehicle—but it is the ability to descend vertically, in a highly controlled manner, that gives the personal flyer its magic appeal, for anyone who has spent any appreciable time traversing the earth's vast regions of remote backcountry will intuitively recognize the benefit that such freedom to land almost anywhere confers.

A particular concept of 'personal flight' has evolved over time to include: "the ability of a person to fly about freely, in three dimensions, to take-off and land vertically, with a minimum of artificial contrivance." That such a vehicle must, especially where human operators are concerned, be made as safe as possible, is a given. The predominant answer to the problem of safety in the art has been one of over-engineering of the primary propulsion system, and the provision of various "back-up" systems. Some designs provide for secondary emergency-descent system, such as a ballistic parachute. These measures have been deemed insufficient by the public because to date, no vertically-flying personal aircraft have gained wide acceptance in the recreational marketplace. However, much was learned in the "motorized hang-glider" era, and the present-day phenomenon of "motorized parachutes" makes a strong case that simple, 'minimalist' aircraft will be accepted as a popular, recreational craft if the vehicle is perceived as having a high safety-quotient. The 'low and slow' Flying Parachutes, "Trikes", etc., have proven to be practical, reasonably safe, (continued . . . ) and of high utility in a number of applications besides sport aviation. However, the ultimate 'backyard flier' is, by definition, a Vertical Take off and Landing (VToL) one, and even the best powered parachutes require a take-off run and clearance over obstacles. The question raised is how to incorporate the 'intrinsic safety' of the powered parachute into a VToL craft having reasonably small dimensions. In this air-vehicle invention, resolution of the problem of a small personal VToL flyer is made by applying several concepts borrowed from the early 'hang-glider" technology, especially in regards to weight-shift control, light wire-braced framing, and use of composites. It benefits from the improved thrust/hp ratio of modem power plants, and of the new "dual-vortex' propulsion system, described in a separate Utility patent application, currently being prepared. This air-vehicle invention also benefits from a novel application of a multiplicity of rotatable louver-vanes, placed radially above and below a disk of counter-rotating blades, acting as a descent-retarding mechanism, as described herein.

Flying Platforms:

(Non Patent Literature: (2) Hiller Aviation Museum—Zimmerman excerpt, 2 pages (3) R. Paul Hill biography, wikepedia, 4 pages (4) Synopsis of "Unconventional Flying Objects" by Paul Hill, 4 pages)

Another feature in the prior art of value in the search for a safe personal air vehicle is the weight-shift control concept, as applied to the flying-platform type of vehicle. Research started in 1951 by Dr. C. Zimmerman, and furthered by NASA engineer Paul Hill, proved that for small, hovering vehicles, fine vernier directional control of the craft is most simply accomplished by the pilot shifting his or her weight in relation to the crafts' normal Centre-of-Gravity (C of G). The "craft" was a simple platform to stand on, to which a thrusting device is attached, in a fixed position, with the thrust directed downward. This research led to flying platforms for the military, and experimental vehicles for the Lunar Rover program. The standing position was discovered to be the best, and it was postulated that man's long evolution of bi-pedalism resulted in a matchless capacity of humans for upright balance. This skill is transferable to operations in three dimensions as well as the usual two, a fact possibly accounted for by man's 3-d, arboreal locomotion in our distant past. But flying platforms have a major stability problem; being top-heavy, they are 'tippy' and can over-rotate to an inverted position when tilted too far. U.S. Pat. No. 2,953,321, the Hiller Flying Platform, is typical of this category in its use of a deployable ballistic parachute as a means of secondary, emergency descent. However, problems include the possibility of the vehicle being at too low an altitude for adequate time for the parachute canopy to inflate. It also depends on the pilot being capable of initiating the deployment—which may not be the case. The pilot may be incapacitated or momentarily frozen by the stress of the moment. These parachutes provide no control over the descent, which may land the vehicle dangerously, in a body of water, busy highway, etc. Since rotors aren't efficient at developing lift than are fixed wing aircraft, flying platforms are less fuel-efficient, with less range.

Safe Aerodynamic Descent:

An aircraft designed for safe hovering and low-and-slow flight requires a sturdy pilot enclosure and a reliable secondary means of a slow, controllable, power-off descent. In other words, if an exclusive reliance on auto-rotation is replaced by reliance upon an intrinsic, aerodynamic capacity of the vehicle-as-a-whole, the vertically-flying vehicle can be made safe. To date, no ultra light VToL air vehicle designs have attempted to modify the aero-form itself, to serve as a secondary means of descent in the event of propulsion-system failure.

Additional Requirements of a Personal Air-Vehicle:

For the prospective casual pilot—one who intends only recreational, weekend use, there are other concerns that also involve safety. Ideally, The field has benefited from new, high power-to-weight motors and modern ultra-light aircraft construction Methods and Materials. This affords the possibility of new types of VToL one and two-place ultralights that are relatively inexpensive. These three objects—easy-to-learn, affordablility, and with a built-in, intrinsically safe descent, would put such a VToL Flyer in the recreational category, with significant market potential.

Personal Helicopters:

Personal helicopters are a growing market, but require a substantial commitment in cost and training time required, and will never, for these reasons, become the 'popular backyard flyer'. A wide-diameter open rotor, mechanical and operational over-complexity, and no substantial means of secondary descent in the event of failure of the primary rotor to auto-rotate, all conspire to make the conventional helicopter a poor candidate as a mass-market VToL flier. Casual users are unwilling to commit the time necessary for initial and ongoing refresher training. With a rotor diameter of 9 meters or more, even the smallest helicopters require a substantial space for landing and taking-off. Rotor tip-strikes against obstacles near the ground is the most common causes of helicopter accidents. They have limited lift, and are too expensive for the average person. Since rotors aren't as efficient at producing lift than a fixed-wing, helicopters are less fuel efficient, with less utility and cross-country capability.

Parachute-Wings:

To date, the motorized parachute-wing, or para-glider, and the motorized Rogallo-wing, also known as a 'trike' are the only two aircraft in the recreational category that have an intrinsically safe descent capability. The Rogallo-wing is not a true wing and does not create lift as does a true, airfoil-section wing. Instead, it relies on the "kite effect" to arrest descent, which involves presenting a flat surface of sufficient area to the oncoming airflow. Thus, while it is not capable of a vertical take-off, Rogallos can be made to descend vertically, or nearly vertically, with very little forward motion. Para-gliders, or para-sails or parachute-wings, do employ an airfoil shape to create lift, but this only occurs when the wing has a forward motion, relative to the air, which is higher than the wings' stall speed, which is usually quite slow, around 5-10 kph. Below its stall speed the para-glider does not use lift to arrest its descent, but employs the kite-effect, like the Rogallo, and also the "parachute effect". The parachute effect occurs when, during its vertical descent, the upwardly-convex undersurface of the parasail captures a bubble of air, in the same manner as a conventional, hemi spherically-shaped parachute. Thus, unlike a conventional airfoil-section wing with a flat bottom surface, the highly upwardly-convex Rogallo-wing and the parachute-wing both provide an acceptably slow vertical descent with little or no forward motion. Para-sails or para-glider types are customarily non-rigid, constructed from fabric and using ambient airflow to inflate pockets, or cells, to attain its wing-like shape. Rogallos are semi-ridgid, with inflated fabric pockets on a triangular plan-form frame. Semi-rigid and rigid construction modes are possible with this air-vehicle invention, using composites and other lightweight materials. Some rigid, fixed-wing ultra light aircraft have also incorporated wings with such a highly (continue . . . ) cambered airfoil section that, upon descent, they exhibit the parachute effect. Flying-wing, ultra-light motor-gliders, including the Mitchell Wing A-10, are able, when speed is reduced below the stall, to transition to a parachute-effect vertical descent that remains controllable. It stands repeating however, that while both the Rogallo and parasail-types are capable of near-vertical descents, the motorized versions require a large enough take-off area to facilitate a take-off run of some appreciable distance. Thus, para-glider type aeroforms are capable of slow vertical descents, by virtue of their intrinsic, aerodynamic shape, using the kite-effect and the parachute effect. A slow landing is a built-in feature of this aero form; it is part of the airframe and is available full-time, regardless of the status of the main propulsion system. In summary, the para-glider is not capable of vertical take-offs, like a helicopter. In normal forward flight the canopy or rigid parachute-wing does act as a true wing, which renders the aircraft more efficient in lift and therefore more fuel efficient than a helicopter. In the event of a motor failure, the parachute wing offers a respectable glide ratio up to approximately 3 or 4 to one, is controllable, and has acceptably low landing speeds.

A noted feature of the motorized paraglider is its capability of a slow vertical descent, with or without a functioning propulsion unit. The descent system is deployed full time and requires no action on the part of the pilot during an emergency descent. Safety is what has made motorized paragliding the popular sport it has become. As noted, although the nominal wingspan of this type, at around 9 meters, is suitable for vertically taking-off from a confined space if it were so able, its inability to lift vertically and the need for a large area for take-offs is a big drawback. The addition of VToL capability would make this already popular form of recreational flying available to more people. A paraglider-type air-vehicle with VToL capability offers enhanced flying experience with the added dimension of hovering and precise directional control.

One solution to giving a para-glider aero-form VToL capability was the ArcWing, U.S. Pat. No. 415,131. It is a deflected-thrust type of lifter, but instead of using independent deflector flaps, as previous types had done, the ArcWing uses the main parasail itself as the deflector. Transition from vertical to forward normal flight is by mechanically altering the position of the wing, simultaneously changing its angle-of-incidence relative to the horizontal thrust produced by the vertically-mounted propeller. Like other deflected-thrust types, the ArcWing suffers the major disadvantage of loss of thrust during the re-directing process, requiring more powerful, heavier motors for vertical take-offs.

Aircraft Using Parachute-Wing/Descent-Vanes with Horizontally-Mounted Propeller, No Existing Classification Found:

Other examples showing personal aircraft using a down-thrust, or horizontally-mounted rotor to propel a weight-shift controlled paraglider are not known. If deemed a new type, criteria may include: 1) Full-time, parachute-like aerodynamic descent, using descent appendages, vanes, panels, wings, etc., and capable of a stable, controllable vertical descent; 2) a powered rotor for vertical take-off and landing, & hover; 3) In forward flight, the attached descent elements—descent sails, descent vanes, descent wings, etc. also produce lift, for better efficiency and higher top speeds.

Ducted-Fan Aircraft, Tiltrotors, Winged Rotorcraft:

Many rotor and ducted-fan arrangements are known, and include: tilt-rotors, tilt-wings, circular disk-wings, and variants with wings in the monoplane, biplane, and multi-plane configurations. The art contains winged lifting-disks, or winged ducted propellers, of which U.S. Pat. No. 7,281,680, by inventor Melkuti, is a recent example. The wings are small relative to the crafts' overall plan-form, and have an airfoil section selected for efficiency in the mid and upper speed range of the vehicle. Therefore the glide characteristics are poor, with a relatively high stall-speed, low glide ratio, and fast rates of descent. Invariably, the wings mounted on ducted rotor vehicles have been true wings, which have the primary purpose of providing lift in normal forward flight. None are configured to affect low-speed descents and, as we have seen, while certain types of true wings can be used as effective descent elements, so can a flat panel, a cambered surface, or some other form of appendage. In comparison, the parachute-glider type of aero form, that is especially designed for both gliding and vertical (parachute) descents, have sufficient drag-producing area to arrest an emergency descent—besides providing efficient lift during normal forward flight as well. For the 'true-wing' configurations, employed on the ducted-fan, tilt-rotor types, etc., the object of a slow, vertical aerodynamic descent has not been claimed.

Flying platforms typically have a shroud or duct surrounding the rotor for safety and to improve efficiency. The top inlet of this duct is flaired outward to create lift and to improve the smooth inflow of air. Robertson (U.S. Pat. No. 2,953,321) is a good example. It has been periodically suggested that by expanding the curved top edge into an annular airfoil, it would act, during an unpowered descent, like a parachute. In fact this idea was fully developed 85 years ago by Polish Air Force Captain, A. Sippowicz (Non-Patent Literature (1) pg. 32 and 33, excerpts from "UFO's and Antigravity' By Leonard Cramp, 6 pages)—but it has drawbacks, especially if applied to a platform-type vehicle where the pilot is standing. While Sippowicz's 1928 Helipan can produce a slow unpowered descent, it also renders the vehicle incapable of horizontal flight at speed, or operation in anything more than a light breeze. Unlike a helicopter rotor-disk, which operates within a column of air of its own creation, and can develop lift and thrust whichever direction it is oriented in, the same is not true of a flat or curved surface, such as a Helipan-type annular ring-airfoil, because it cannot create lift at a negative pitch of more than 2 or 3 degrees. Tilted further, the down force on the top surface overcomes lift, requiring more and more power to maintain altitude, because flying platforms can only increase horizontal speed by increasing pitch, which produces more drag, and so on, and so is self-defeating. The only way to overcome this defect would be to not pitch the flying platform to initiate horizontal flight, but instead rely on some form of auxiliary power to propel it horizontally. The platform could not then be weight-shift controlled however. Perhaps the enlarged inlet-ring could be set at a predetermined angle, or made rotatable in relation to the plane of the rotor, but this would then interfere with its primary function —the efficient (and symmetrical) inflow of air. An annular ring of a diameter sufficient to arrest a descent would also occlude the downward view of the pilot. In any case no-one has claimed or attempted such a "descent-ring" on a platform. Insofar as flying platforms go, the main disqualifying flaw in the descent-ring solution is that, with the pilot standing, the duct inlet will always be located well below the vehicles' centre-of-gravity.

This is of no consequence when under power, when the inlet is functioning as an inlet and the craft is supported on a column of air. But, for an unpowered descent, this location for a descent-arresting airfoil is catastrophic. Being top-heavy, tip-overs are the only possible outcome. This is especially true the bigger or more curved the ring is, since a curved surface always inclines towards the direction of least resistance—towards the direction it is curved in, thus forcing a rapid turn-over of the vehicle every time (and which I have personally empirically tested using models). My descent-vane system, in contrast, has airfoils that are engaged with the airflow at the correct angle for sustained horizontal flight at speed and, being placed high above the C of G, or at the very top of the aircraft, no centre of gravity or turn-over problems are encountered. In fact, the top position is the ultimate where an unpowered descent is concerned, because the "pendulum effect" gives the platform the maximum possible stability during an unpowered descent.

Winged Helicopters:

Improvements in the power/weight ratios of small gas engines, and the increasing affordability of powerful, small jet turbines has given new impetus to the VToL field. As a class, small one and two-man helicopters have had the most success. While no winged ultra light helicopters are known, some experimental and military helicopters incorporate lifting wings in configuration with one or more lifting rotors, in so-called "hybrid" configurations. Where employed, examples of this design strive to gain efficiency at the higher speeds, and produce faster top speeds, and the wings have little or no effect in an un-powered descent mode.

In the event of an engine failure of a conventional helicopter type, a gliding-type landing is attempted by the pilot by a process of autorotation, but this requires much training. Damage to a rotor is a more serious problem, because there is no opportunity for any secondary descent capability, such as a ballistic parachute. Because of these limitations helicopters are best left to the professional/commercial field. Because of the complexity of their control system and the high training requirement, helicopters of a conventional configuration are unlikely to become widely popular as a recreational flyer.

Emergency Descent of Flying Platforms:

Flying Platforms are another subclass of the VToL field, which has benefited from improvements in small, lightweight motors. Here, the payload or occupant is located on a small platform centered above the lifting rotor. Contra-rotating rotors have frequently been used, in order to defeat the problem of torque and the need of a tail rotor. Unfortunately, it was difficult to engineer a co-axial, counter-rotating rotor system that is also capable of auto-rotating and, being generally of the ducted variety, these rotors are of too small a diameter to effectively auto-rotate in any case. Unlike a helicopter however, the platform can be equipped with a ballistic safety-parachute because there are no overhead rotors for the canopy to get entangled with. Its not an ideal solution, because of the potential for mechanical failure of the ejection system, and because it may require the fast reaction of the pilot to an emergency situation and is not automatic.

Previous winged vtol aircraft have relied upon two separate thrusting sources—one for lift and one for forward flight. Melkuti (U.S. Pat. No. 7,281,680B2) departed from this by using one rotary wing means for both lift and thrust, and he identified this difference as the main advantage over prior art. My Liftjet invention shares this particular feature with Melkuti, but is otherwise different from his, and all other winged vtol aircraft in every respect; To date, all winged vtols, including Melkuti, place their wing surface on the same plane as their lifting rotor, and there is a particular reason to doing so. But there are also drawbacks. As Melkuti describes . . . "Spanwise the forward lifting surface 22 terminates in wing extensions 26 and 28." (page 3, paragraph 35). The use of such "stub wings" is common—made necessary by the structural limitations of setting the wings alongside the quite large circular hole of the rotor duct. The wings are also made small because of the design philosophy in which there are distinct and separate modes for vertical vs. horizontal flight. The argument goes, 'because the rotor is relied upon for descent, the wings are necessary only to sustain level flight—therefor the faster, the better.' My approach is quite different, for without the need for a hole for the rotor, my wing, or "descent vane" can be made much larger—large enough, in fact, to serve its primary duty as an emergency descent-arresting airfoil. The prevailing philosophy on winged vtol aircraft has resulted in an overall configuration of a low-wing general-aviation monoplane, with a rotor system fitted on. Again using Melkuti for example, we find a streamlined, low-slung fuselage with tandem seating, again to favour speed. My Liftjets' top speed could never compare, being that the pilot, in a standing position, produces, with or without the vertical columnar canopy, much more drag. But the Liftjet is a machine for a different purpose; By using the simple weight-shift control of a standing pilot, all other flight controls are made redundant. For other winged vtol, these controls are extremely complex, with a separate control system each for both vtol flight and for horizontal flight. Melkuti, for instance, employs 8 different push-rod runs to 8 different control surfaces, plus 9 louvers for vtol flight. Altogether these linkages contain approximately 53 pivot-pins, plus control horns, pull-rods, control sticks, etc—a system of extreme complexity, cost, weight penalty, and difficulty of operation. To date, the control system of this and all other winged vtols has been at least as complex as that of a normal light plane. But, like a hang glider, the basic Liftjet has no controls, (other than a throttle) and the advanced version has only 1 pivot hinge, which connects the descent vane to the pylon for an expanded performance envelope. So while the Liftjet may be slower, it is much easier to learn, and it has a safe way to land when the engine quits, all of which makes the Liftjet much more suited as a recreational vehicle than other winged vtols could ever be.

Safe Descent Capabilities of Existing Types of Personal Aircraft:

While no air-vehicle can be made completely safe, motorized paragliders have the highest degree of intrinsic safety, on account of its full-time, parachute-like, power-off descent capability. It is no accident that the most popular form of flying is also the safest; parasailing, where the air vehicle is towed behind a boat, for example—and has gained wide public acceptance. They are easy to operate. Control is by intuitive, body-shifting and can be learned in a matter of minutes, so the low instruction time and low insurance rates have enabled the commercialization of the parasail. The motorized paraglider field is also a burgeoning industry at this time. It shows the general trend towards low-cost minimum aircraft, with the emphasis on a low and slow, safe recreational flyer. The motorized paragliders' biggest drawback is that it is not capable of Vertical Take-offs and Landings (VToL) but only SToL (Short Take-off and Landing). The field is rife for new inventions.

Trends in the VToL/SToL Fields of Invention:

The VToL field has several identifiable areas of specific development. If one includes existing classes of powered motor gliders, parasails, and ultra light "backpack" helicopters, there is a definite focus on a basic "minimalist" aircraft—something along the lines of a tube-and fabric hangglider, having simple weight-shift control—except they would also be capable of taking-off vertically. High power-to-weight ratios of available motors in the 15 to 60 hp range produce enough lift for lightweight personal vertical-flying vehicles. It has been deemed reasonable to define this basic ultra light category of VToL as limited to two people, and has been so treated in the Air Regulations of most western countries. Two people is approximately the upper manageable mass for a weight-shift controlled vehicle in any case.

Comparison of Small & Large Winged Ducted-Propeller VToL Vehicles:

The other end of the VToL spectrum involves high-speed, multi-passenger helicopters, gyroplanes, and winged hybrids, catering to a corporate market, and using wings with flat-bottomed or symmetrical airfoils, which obtain faster top speeds and more efficient level flight than the rotor-only variants. A variety of planforms are included in this category, including canards, annular wings, and box-wing configurations. All use ducted-fan, ducted propeller, or rotors for vertical lift and for all or part of the vehicles' forward propulsion. Some examples have used auxiliary, vertically-mounted propellers for forward propulsion. At a certain minimum forward airspeed, the wings begin to generate lift, which permits the setting of a more acute thrust-angle of the rotor, and therefore higher forward speed for the winged vehicle vs. its wingless equivalent. VToL vehicles of this type, having the lifting rotor buried within the fuselage, tend to be bulky, with a poor aspect-ratio, and the generally stubby wings appended to the fuselage produce poor gliding characteristics, with relatively high stall speeds. Stall-speeds of about 80 kph are common for this class, so—although a gliding, unpowered emergency descent is possible, it is a relatively fast glide, requiring a prepared runway of sufficient length. Non of the winged ducted-propeller VToL craft in the art exhibit slow un-powered descents that are vertical or near-vertical. By comparison, the air vehicle of this invention is equipped with descent-vanes rather than wings, and these descent-vanes are designed for the primary purpose of providing a safe, vertical or near-vertical descent in the event of an engine failure. That these descent-vanes, in some embodiments, have the shape and the appearance of wings, and may also produce additional lift during forward flight, is a secondary and incidental aspect of their design.

Comparison with Other Types of VToL Vehicles:

There is no advantage to large multi-passenger helicopters or gyroplanes being formed into, or adopting the shape of a parachute-glider, because any wing or appendage of reasonable proportion will be too small in area, in relation to the vehicle's weight, to produce a slow vertical descent. An aerodynamic descent as a secondary, emergency descent feature is appropriate for smaller craft only—one person, two person, or at a maximum, three person flying vehicles, and, with modifications to be described herein, small transport vehicles carrying several passengers or cargo.

Background of Invention—Objects and Advantages:

Accordingly, besides the objects and advantages of a 'piggy-backed" descent-vanes to provide safe unpowered descent for a VToL air-vehicle, as described in this patent, there are several additional objects and advantages of the present invention. Any widespread recreational use of a vertically-flying personal aircraft will be predicated upon providing a vehicle that has a built-in, full-time, parachute-like descent capability. The problem to be solved is not: "High-Speed, High-Performance flight with VToL Capability", but: "Safe, Low-Speed Flight with VToL Capability". The art contains winged ducted-aircraft, with none claiming the benefit of a safe vertical descent from a secondary system based upon a wing or vane-like appendage that is specifically configured to provide maximum air resistance (continued . . . ) during a vertical descent. With my air-vehicle invention, while a vertical or near-vertical descent is available to the pilot at any time, in practice, a 'gliding-descent' is also at the option of the pilot and may be used where the size of the landing area permits.

My air-vehicle invention operates by different means of descent, in that it has a secondary, parachute/gliding descent that is controllable, and that provides the benefit of increased safety in the event of the failure of the motorized lifting-rotor. The method of operation, the structure, and the composition and materials of this air-vehicle invention's planar appendages are all dissimilar to the appendages of the prior art. My invention's appended Descent-Vanes are specifically descent-arresting surfaces, with embodiments having fabric descent panels, or semi-rigid descent-panels—materials and construction methods not possible with the conventional designs of the arts' Winged Ducted Propeller Aircraft.

Motorized Paragliders:

In the field of personal flying vehicles, trends in the art show a strong inclination towards vehicles having VToL capability. Motorized paragliders can be configured to land vertically, or almost vertically, but cannot take-off vertically. Although they are classed as SToL (Short Take-off and Landing) they have other features, such as safety, simplicity of operation and low-cost, which have made them an important segment of the art. From this perspective, the addition of a horizontal rotor for VToL flight might seem a logical next-step in the art, but the reality is that the marriage of a descent system based on a parachute-like element, together with a lifting system comprising a rotor, with the attendant problem of its downwash, is anti-intuitive. However, there is a limited set of configurations that can successfully mate the two elements.

DETAILED DESCRIPTION OF THE INVENTION

Prior Art

The purpose of this invention is to successfully join two known devices: 1) the horizontally-arranged, vertically-lifting propeller and its ducted variants. 2) a parachute-glider.

Rotor Systems—Prior Art:

Recent art has many examples of efficient ducted-propeller and ducted-rotor systems suitably configured for one and two-person flying vehicles. Both single and contra-rotating, co-axial rotors, driven by motors of 20 to 80 hp. have sufficient lift for occupants and a lightweight fuselage or superstructure. In variants having single-rotor propulsion, axial vanes redirect thrust from the rotor to counteract torque.

SUMMARY

In accordance with one embodiment a vertical take-off and landing air-vehicle comprising a fuselage, to which are affixed a horizontal lifting and propulsion rotor, and to which are also appended two or more planar members, or descent-vanes.

Advantages: Accordingly several advantages of one or more aspects are as follows: to provide a VToL air vehicle that, upon the inoperability of the primary propulsion system, provides a vertical or near-vertical descent of sufficiently low speed as to avoid gross physical damage to the vehicle or its payload or occupants.

The claim of "safety" comes from the intrinsic safety provided by the descent-vanes, which are piggy-backed, fully and fixedly deployed, to act as a species of flying parachute. High drag ratios of this air-vehicle invention limit top speeds to an estimated 50 mph., for a vehicle equipped with a 25 hp. aero-motor.

Special Features of this Invention:

Several novel feature are distinctive to this invention. Primary control is weight shift, with optional control surfaces such as: bias-hinged dual-mode rudder, elevon, etc., for additional control.

Note Re: Nomeclature:

While all prior references are to the interchangeable terms; 'descent-wings' or 'descent-vanes', the latter is the more accurate and will be used henceforth. While these appendages may have the form of a true, airfoil-section, lift-generating wing—other forms, operating by a 'parachute' or resistance-generating capability, have also been successfully used. These panels may be flat, kite-like surfaces, Rogallo-wings, etc. Therefore the term 'descent-vane' is preferred, as the phrase contains its actual function as well as its general shape.

DRAWINGS—FIGURES

In the Drawings, closely related figures have the same number but different alphabetic suffixes.

FIG. 1. Preferred Embodiment in Powered Flight
FIG. 2.*a* Alternate Embodiment in Powered Flight
FIG. 2.*b* Alternative Embodiment in Unpowered Descent
FIG. 3. Preferred Embodiment with Semi-Rigid Fabric Descent-Vanes
FIG. 4. Other Embodiment Having Tandem, Bi-Vane, Descent-Vanes
FIG. 5. Prior-Art—Torque-Operated Propeller/Rotor
FIG. 6. Component "a." Dual-Vortex Lifting Rotor-Disk
FIG. 7. Component "a." Dual-Vortex Lifting-Rotor-Disk with Louver-Vanes
FIG. 8. Louver-Vanes, Power-on Position
FIG. 9. Louver-Vanes, Descent Position
FIG. 10. Optional Louver-Vane Patterns
FIG. 12. AE, Front-View, Showing Descent-Vane Action
FIG. 13. AE, Side-View
FIG. 14. AE, Descent-Vane Cross-Section Showing Twist
FIG. 15. Optional Hinge Extension
FIG. 16. PE with Rotatable Vanes
FIG. 17. PE with Rotatable Lifting Disk
FIG. 18. PE, Diminutive, High-Performance "Sport-Model"
FIG. 19. AE with Dual-Mode Rudder
FIG. 20. AE with 4 Upright Mounting Struts

DRAWINGS, REFERENCE NUMERALS

In the Reference Numerals, closely related figures have the same number but different alphabetic suffixes.

| | | | |
|---|---|---|---|
| a. | Lifting Rotor-Disk | b. | Fuselage |
| c.i. | Descent-Vane, Left Panel | c.ii. | Descent-Vane, Right Panel |
| d. | Payload & Occupants | e. | Landing Gear |
| f. | (f.13 to f.16, incl) Louver-Vanes | g. | Tail--Boom/Fin/Rudder--Assembly |
| h. | (h.i, h.ii, h.x) Upright Mounting Struts | i. | Descent-Vane Support Frame Members |
| j. | (j.i, j.ii,) Additional Pair, Descent-Vanes | 1 | Shaft & Bearing |
| 2 | Turntable Mounting Hub | 3 | Rotor Strut |
| 4 | Auto-rotating Rotor-Blade | 5 | Motor |
| 6 | Propeller, or Inner Rotor | 7 | Inner Duct-Ring |
| 8 | Dorsal Spokes, or Connecting Struts | 9 | Inner Shaping Cowl |
| 10 | Aero-Skirt, or "Aerodroid" Aero-form | 11 | Outer Duct-Ring, or Shroud |
| 12 | Ventral Spokes, or Connecting Struts | f.13 | Outer Dorsal Louver-Vanes |

| | | | |
|---|---|---|---|
| f.14 | Inner Dorsal Louver-Vanes | f.15 | Outer Ventral Louver-Vanes |
| f.16 | Inner Ventral Louver-Vanes | 17 | Central Panel, Amphibious |
| 18.f | Spin Trim-Tabs, Front | 18.r | Spin Trim Tabs, Rear |
| 19.f | Spin Trim-Slot, Front | 19.r | Spin Trim Tabs, Rear |
| 20 | Descent-Vane Control Bar | 21 | Pivot Bearing |
| 22 | Rotatable Control Handle-Bar | 23 | Elevons |
| 24 | Pitch-Trim Flap | | |

Detailed Description, Preferred Embodiment: (FIG. 1)

The Preferred Embodiment (FIG. 1.) has the lifting rotor-disk a. mounted ventrally. Landing gear e. are attached to the disk to provide clearance from the ground when at rest. The payload or occupant d. is located on a platform above the disk, giving sufficient clearance above the disk so as not to present significant restriction of the inflow of air. A vertical structural member of the fuselage, or pylori, b. serves as a mounting-post for the descent-vanes, c.i & c.ii which are mounted laterally, in a form similar to a high-wing, fixed-wing craft. Note that while the descent-vanes may optionally be rigidly fixed, or non-rotatable, in one further Additional Embodiment (FIG. 16) these vanes do rotate to change the airfoil's angle of attack, the same as they do in the Alternate Embodiment (FIGS. 2.a. & 2.b.). In the Preferred Embodiment and further additional embodiments, during both the powered phase and un-powered descent phase, the vanes are oriented to react with ambient air to provide lift when it is moving forward, and to provide drag resistance in an un-powered vertical descent.

Preferred Embodiment Having a Fabric Panel Descent-Vane: (FIG. 3.)

FIG. 3. is an isometric view of this air-vehicle invention where the left and right descent-vane panels c.ii & c.ii are constructed from fabric and are contiguously joined at the centre. The joined panels are supported by a lightweight framework of tubing or suitable material, i. which is elevated above the rotor-disk my means of one or more pylons, h.i, h.ii, & h.x. These descent vanes may be formed as a double-layer, cellular-type, which is supported, in its un-inflated at-rest position, by the framework. The cells inflate to their airfoil-section shape with forward movement, and the fabric vane panels are restrained to their arc-shape, by means of affixing the bottom surface of the cells to a supporting framework. In this embodiment, weight-shift control is supplemented with control via canopy manipulation. As with a conventional sport para-sail, it uses control-wires to deflect the rear corners of the canopy.

Special Appeal of the "Parachute-Wing":

While this embodiment has, as expected, the poorest performance of those tested in terms of top speed and maneuverability, it may prove to be the most popular of all in the marketplace. While not intrinsically safer or less safe than the other embodiments, it will benefit from the public perception of parachutes, per-se, being relatively safe. Including boat-towed parasailing, and motorized para-sails, parachute sports make up by far the most popular of all flying sports The sight of a motorized parachute with VToL capability is likely to entice a good proportion of those who would otherwise be leery of ultra-light flying.

Preferred Embodiment, Detailed Description:

The Preferred Embodiment (FIG. 1) places the lifting rotor-disk a. at the bottom, with landing gear e. attached to the undersurface, to provide clearance from the ground when at rest. The payload or occupant d. is located on top of the disk, on a platform above the disk, giving sufficient clearance above the disk so as not to present significant restriction to the inflow of air. A vertical structural member of the fuselage b. serves as a mounting-post for the descent-vanes, mounted dorsally, extending out laterally in a form similar to a high-wing, fixed-wing aircraft. While the descent-vanes may optionally be fixed, or non-rotatable, in further embodiments including a version of the Alternate Embodiment, these vanes do rotate to change the airfoil's angle of attack. In the Preferred Embodiment, during both the powered and un-powered descent phases, the vanes are oriented (cont. . . . ) to react with ambient air to provide lift when the air-vehicle is moving forward, and to provide drag resistance in an un-powered vertical descent.

Lifting Disk-Shell, Description and Operation: (FIGS. 6, 7, 8, 9)

The rotor and motor assembly is enclosed inside a disk-like shell, with the rounded outer edge of An outer-duct 11 making up the periphery, having a height of about $\frac{1}{3}^{rd}$ the diameter of the duct or less. The motor, which occupies the centre of the duct is equipped with a shroud 9 and nose cone to improve airflow. Lightweight spokes 8 (FIGS. 6.) and 12 (FIG. 7.), are fixed radially between the outer, non-rotating duct 11 and central, non-rotating structural member or centre-plate, thus creating top and bottom planes. Rotatably-mounted on the spokes are vanes of airfoil-section, made of a length sufficient to span the distance between the inside face of the outer duct and the outer face of the central shroud, (FIG. 8). Experimentally, vane chords equaling about $\frac{1}{36}^{th}$ of the perimeter worked well on 1-meter diameter ducts. Vanes are tapered at leading and trailing edges so that, when laid flat within the disk, are proportionally wedge-shaped in plan-form. Vanes are rotatably mounted on the axis of the spokes at or near the vanes' centre of gravity. When laid flat around the planes of the ducts' inlet and outlet, a space of approximately ½ of the vanes' chord is left open between the edges of each neighboring vane, creating a slotted surface area. When juxtaposed above or below its apposite ring of vanes and given a rotational offset so as to occlude the entire surface, (FIGS. 8. & 9.) flow-through turbulence in the space between the disks produce resistance and additional drag. The convex, or airfoil-section vanes are highly cambered and (continued . . . ) produce the parachute-effect when prevented from over-rotating away from the horizontal position in a free-fall descent. Over-rotation is prevented by a simple mechanical stop or a retaining strap. Some play is allowed—a stretch or spring-loaded retainer, permitting 10 degrees +− negative and positive travel from the horizontal, resulting in induced oscillations which contribute additional lift for descent-arresting capability.

The Preferred Embodiment may optionally employ single-rotor, or dual contra-rotating rotor-systems. In single-rotor variants, the radially arranged louver-vanes described above, serve the dual purpose of 1) occluding the duct opening, upon any un-powered descent. 2) In the powered mode redirecting the thrust so as to counter torque produced by the motor.

When in the powered phase, air acts upon the inlet and outlet louver-vanes and creates a small additional lift vector. The duct, with its vane-equipped inlet and outlet, creates a 'birdcage' type of structure. The propulsive rotor and motor operates independently within the space comprising this non-rotating hollow disk Mounting Rotor Disk to Fuselage: (FIG. 1., FIG. 2.a.)

In the Preferred Embodiment, (FIG. 1.) the fuselage b. is mounted on top, and offset to the fore from the centre of the disk. The fuselage is mounted using one or more struts, providing the minimum clearance from the disk intake as to avoid any substantial restriction of the airflow. On both the PE and AE embodiments, the mass of the payload d. is offset to the front of the centre of the rotor/lifting-disk, a. thus balancing the mass located to the rear of the rotor's centre of lift, which is comprised of the descent-vanes, c.i & c.ii and (optional) tailfin and rudder assembly, g. (FIG. 2.a.) The moment-arms thus created, between the occupant and the vehicles' centre-of-gravity, provides leverage for the pilot/payload to exert more positive weight-shifting control.

Preferred Embodiment, Fuselage Construction: (FIGS. 1, 12, 13, & 20.)

A basic fuselage b. has at least one vertical pylori of sufficient height to accommodate an average standing person. Affixed to the bottom is a planar member, or platform, sufficient in size to allow the occupant to move about one and one-half steps fore-and-aft, and a half-step side-to-side. The front is raised, at an angle to the horizontal of between approximately 10 to 40 degree of arc. At a predetermined height above the floor, horizontal handrails are affixed to a vertical structural member, providing leverage for the pilot to exert weight-shift control against. The hand-bars are made approximately parallel with the floor and are joined at the front, contiguously forming a pilot-retaining member, or safety-bar. A streamlined, pod-shaped fuselage may optionally be added, (FIG. 12. & FIG. 13.) to provide protection for the pilot from the elements (and from the down thrust in the case of the Alternate Embodiment.) Such a pod-like structure, made from rigid, lightweight materials in the monocoque construction method, (FIG. 20.) is provided with a means of egress by dividing the pod into a fore and a rear section, with a hinge-line on either the left or right side, so that the fore section, equipped with clear material for (continued next page . . . ) visibility, swings open to the fore and is held securely in place by means of latches when in the closed position.

Preferred Embodiment—Optional Control Surfaces: (FIGS. 2.a, 2.b., 13. & 17.)

Besides the primary means of weight-shift directional control and throttle-controlled ascent/descent, the PE may optionally be fitted with elevons, 23 (FIG. 17) located at the tips of the trailing edges of the descent-vane panels. Planar members of a predetermined size are fitted to the wingtips by hinges, to be operated up or down in co-ordination with, or opposite to, the opposing wing-tip elevon. Alternatively, a system of wing-tip warping, as is commonly used on the "trike" type of powered Rogallo-wing aircraft may be employed. Either system obviates the need for the optional rudder g. (FIG. 13), and the optional trim-flap 24 (FIG. 13.) control surfaces.

Alternate Embodiment Detailed Description: (FIGS. 2.a., 2.b.)

In the Alternate Embodiment (FIGS. 2.a., 2.b.) the non-rotating lifting disk is located dorsally, with the payload slung beneath. Extensive modeling and testing by this inventor identified two main embodiments which used the same components placed at different locations. The Alternate Embodiment has the lifting (continued next page . . . ) propeller, or rotor, on top, like a helicopter, with the descent-wings, or descent-vanes, c.i & c.ii attached longitudinally, alongside the fuselage, and mounted so the chord of the wing is oriented vertically, with the leading edge of the airfoil pointing upwards into the down thrust. The rotary motion of the down force that would normally cause this configuration to spin, is nullified through three specific modifications, to be explained in a further description. In a power-off descent mode, the descent-vanes, which are rotatably-mounted by a hinged strut h. to a structural fuselage or landing-gear member, e. operate with the ambient air, in which they are moved by air pressure to rotate into a horizontal-lying position, where they are restrained by mechanical means, restraining straps, etc. In this position they act as a glider and as a parachute-sail. During normal powered flight, the vertically-oriented vane, canted with a few degrees of negative angle of attack, produces additional lift provided by the action of downwash on the vane.

Alternate Embodiment, Mounting of Vanes: (FIGS. 2.a., 2.b., 7., 8., 12., 17., 20.)

The craft is supported upon the ground at rest with an assembly of at least two elongated landing-gear members, e. (FIG. 2.a). Experimentally, models having a quadrangle arrangement of landing gear (FIG. 20) were most satisfactory, in that they also provided four structural anchors for the uprights, h. upon which the descent vanes are mounted. This made the most efficient use of structure, besides providing a stable base upon the ground. At each of the four points near where the horizontal and vertical portions of (continued . . . ) the landing gear are joined, upright members h. (FIG. 2.a.) are located which extends vertically to a point approximately ¼ to ½ of the distance from the platform to the bottom of the lifting disk. This puts the leading edge of the descent vane at a level where, when the vane is lifted, with its chord extended horizontally, a substantial portion of the payload or occupant's weight is suspended below the horizontal plane of the extended vanes, (FIG. 12.). The front upright struts are a predetermined distance higher than the rear struts so as to create a positive angle-of-incidence when the vanes are fully extended and horizontal-lying, (FIG. 13.) thus providing a lifting surface when in forward flight. One each of a left-side and a right-side descent-vane c.i & c.ii (FIG. 2.a.) is rotatably-mounted to a fore-and-aft upright strut e. or suitable structural member, at a point at or close to the vane's centre-of-pressure, or center-of-lift. The trailing edge of the descent-vanes may be secured by wires, straps, or stop-plate, so that, when air-pressure from the descent supports the vane, it is held in its horizontal position. The normal, at-rest position of the descent-vanes is vertical (FIG. 17.). A mechanical stop is used to prevent the trailing edge from over-rotating, so that the leading edge is, depending on the airfoil chosen, between approximately minus 2 and minus 8 degrees angle-of-incidence relative to the relative airflow (down thrust) from the rotor (FIG. 8.). At this angle, airflow from the rotor creates lift on the vane. The radial louver-vanes f. (FIG. 2.a.) act as a diffuser and remove some rotational force from the down thrust. In embodiments using the newly-invented type of 'dual-vortex' counter-rotating propeller, (FIG. 7.) down thrust from the rotor is bi-directional, with an outer ring of downwash rotating one way, and an inner ring of thrust turning the other. Some cancellation of the rotating forces and diffusion takes place, but a residual amount of rotational force remains which requires correction. Side-force against the descent-vanes is corrected for by (1) twisting the roots and the tips, where they encounter the most pronounced spin (FIG. 14.). Where the main rotor spins counter-clockwise as viewed from the top, the left vane is required to have the leading edge turned up at the rear and turned down at the front, and the opposite twist for the right vane. The actual amount of angle will depend upon the scale of the device, distance to vane, strength of motive power, etc. Both left side and right-side vanes are so trimmed. Incorporating this twist makes the descent-vane maximally efficient in generating lift from the downwash during powered flight. The presence of this slight twist is neither a benefit nor a disadvantage during an unpowered descent, because the vane gains its resistance value from its square-area and from the amount of upward camber of the airfoil. (2) Optionally, corrective trim-tabs $18.f$ & $18.r$ (FIGS. 13, & 14.) may also be used, whereby the tab uses air pressure to keep the vane's leading edge oriented at the correct negative angle, while simultaneously countering the spinning imparted by the downwash. (Note: Generally, the smaller the dual-vortex device, the less diffusion and cancelling-out of rotational forces occurs. Full-size vehicles may be trimmed to virtually eliminate substantial 'lag-lead' of control inputs. This occurs due to unwanted imbalance of differential rotational pressure on the flat vertical surfaces. Modelling of a single-place vehicle with a disk-size of about 3 meters, having a 'dual-vortex' type of co-axial propeller system that is equipped with axial diffuser-vanes, f. results in a craft that exhibits the equalized pressure-geometry necessary for a stable hover. At this scale, the outer part of the down-thrust section, which acts upon the end sections of the descent-vanes, is (continued . . . ) within a region of relatively high diffusion. The opposite-rotating inner propeller's down-thrust acts differentially on the underside of the descent vane, producing lift. (3) Trim Slots: Two longitudinal slots, one at the fore of each descent vane, $18.f$ and one at the rear $18.r$ (FIGS. 13. & 14.), mounted on a line bisecting each descent-vane at about the mid-line of the chord, and extending to the underside at a biased angle, creates a leading-edge airfoil and a trailing-edge airfoil at those locations. A corrective twist is then incorporated to both leading and trailing-edge airfoils, by preferential application of more or less degrees of angles-of-incidence to the down thrust. The trim-slots counter the side-force component of the down thrust and exert positive control to stabilize the craft against spinning in a hover. Experimentally, models of $1/12^{th}$ scale descent-vane have been successfully stabilized against down-thrust spin using each of the three trim mechanisms described above. Any or all three methods of controlling thrust-induced spin may be used in combination.

Alternate Embodiment—Optional, Fixed Vertical Panel, Amphibious-Floats: (FIGS. 12., 13., 14., 15.)

The Alternate Embodiment configuration lends itself to the addition of a fixed vertical panel, 17 (FIGS. 12., 13., 14., 15.) having essentially the same shape as the overlying descent-vane, which is fixed immediately inboard of the descent vane, in a fixed vertical position, with the same cant inboard of the leading edge as the at-rest descent vane. Fixed panels 17 are comprised of a lightweight, rigid material and may optionally include a strengthening framework of alum. tubing, wood, carbon-fiber. fiber tubing, etc. This fixed panel serves to provide additional descent-arresting resistance. When constructed with inset panels lightweight material such as expanded foam, the left and right panels also serve as amphibious floats. The additional weight of the panels serve as additional ballast—to ensure an adequate proportion of weight below the horizon of the descent-vanes in their open, power-off descent position. The utility of the vehicle can be further improved by locating the top of the uprights and leading edge of the descent-vane approximately 1 to 1½ meter outboard of the fuselage, with a second, thinner-chorded set of descent-vanes, c.i. in & c.ii.in (FIG. 12), attached by hinges at the leading edge, affixed to the inboard side of the uprights. At rest, these inboard panels hang straight down, and during powered flight air holds them flat against the inside face of the main descent vane or the fixed panel, as the case may be, Thus, during a descent, these vanes swing upwards by air-pressure from below, and are held in the horizontal position by retaining straps or mechanical stops, as with the main, or outboard, descent-vanes. In planform, in the descent-mode, the outboard, or main descent-vanes, c.i &.ii, together with the inboard set, c.i & c.ii, forms a more complete Rogallo, or dart-shaped gliding surface, with an additional area of resistance, the void between the main descent-vanes having been taken-up by the inboard vanes.

Other Version of Alternate Embodiment Having Fixed, Non-Rotatable Descent-Vanes: (FIGS. $2.a$ & $2.b$)

Enabling descent-vanes to rotate into a horizontal-lying position, as with Alternate Embodiment, (FIG. $2.b$) is advantageous to producing a slower descent. However, vanes that are permanently fixed in their near-vertical position (FIG. $2.a$) also produce an acceptably safe, if somewhat faster, un-powered descent. Such a configuration gives performance that is an addition object claimed by this invention Summary, Alternate Embodiment, Descent-Vane Operation: (FIGS. 7-17, Incl.)

Incorporating a twist in the fore and aft sections of the descent-vanes reduces the tendency of the rotational components of the down thrust acting upon the sides of the vanes, to cause the air-vehicle to spin about its vertical axis. The spinning motion is further controlled, where necessary, by the addition of trim-slots, or trim-tabs $18.f$ & $18.r$ (FIGS. 13, 14) attached to the upper, or leading edges, at the extreme front and rear of the vanes, which is the area most impinged upon by the side force component of the down thrust. Trim-tabs are mounted upon short vertical struts and are positioned so as not to occlude the zone of down force which acts directly upon the vane.

Rudder-Less Option: (FIG. 1)

The trimming of a full-size vehicle for a 'hands-off' hover will benefit from the scaling-up advantage on the rotary-force diffusion effect. The anti-spin methods discussed are adequate to produce a stable hover, suited for control by means of weight-shift control only. With this system, vertical ascent and descent control is through accelerator control of the motor. Forward flight is initiated by leaning forward; lean left to turn left, and so on. With the air-vehicle stable in all three axis, the opportunity for such a simple system is possible, but there are limitations, being somewhat dependent on prevailing wind. For example, during windless conditions, there is no alternate source of gaining positive control about the vertical, or spin axis, when the vehicle is in a hover.

Nevertheless, the vehicle is capable of flying without rudder, in all its modes, even though control in one mode is limited. No doubt techniques to counter this will be developed in practice, to preserve the benefits of the 'tail-less' feature. To add to the vehicle's utility, a tail boom/tailfin/rudder assembly, g, of the type shown on the Alternative Embodiment (FIG. $2.a$ & 19.) assembly, my be optionally affixed.

Rudder, —Optional Lateral Yaw Stability and Control:

All embodiments may optionally be equipped with one or more rudders, g. Two horizontal and one vertical structural members are optionally added to the aft of the fuselage, forming a boom, with gussets at the inside corners. These elements create an aerodynamically-stabilizing void at that location (FIG. 19). The rear upright is a planar member which forms a yaw-stabilizing vertical tailfin, to which my be optionally attached by hinges a planar member which forms a movable rudder. The rudder is equipped with control-horns, cables, etc. and may be connected to the pilot's seat or harness, to provide rudder-action that is coordinated with the corresponding weight-shift movement. A distinctive feature of this invention is that the rudder is hinged with the top of the hinge slanting to the rear by about 20 to 40 degrees (FIG. 19.). This angle permit's the rudder surface to be brought to bear against either the thrust down-flow, or by the airflow from forward flight. The rudder, therefore, will control the vehicle about its vertical axis in both hovering flight and in forward flight.

Optional Pitch-Trim Flap for Take-Offs and Landings: (FIGS. 13., 24.)

This Invention has been fitted with an optional aerodynamic shaping surfaces to the outside of the lifting-rotor disk shroud, (FIGS. 13, 24). A planar member, 24, horizontally-mounted and adjustably-moveable on the trailing edge of the disk, a. assists in an un-powered descent by its tendency, during both forward flight and vertical descent, of maintaining the rotor-disk at an aerodynamically optimum, slightly nose-up attitude. When equipped with such a rear flap, movement up or down will be controlled, optionally, by either a separate, dedicated foot or hand control—or a control which is activated by the seat/harness, which in turn is activated by the pilot's movements—or by a combination of both types of controls operating in concert. It has been noted that with scale models, a rear disk-flap in the "up" position provides a much slower rate of vertical descent.

The rear trim-flap serves the further purpose of providing a safer take-off, especially in higher wind-speed conditions. Descent-vane-equipped aircraft are intended to be flown in a manner that takes into account prevailing weather and wind conditions, as with conventional hang-glider practice. Taking-off and landing is always done into the wind—so far as is practicable. At rest on uneven ground, the disk and descent vanes may have a slight positive angle-of-attack into the wind, making them susceptible to lifting-off, and possibly overturning the craft backwards, during a high-speed wind gust. Normally the pilot has positive motion into the wind by using disk-thrust, resulting in a controlled take-off. However, where the vehicle is not yet under power, the vehicle may be lifted up at the front and also blown back and over. The rear flap serves to correct the positive angle so that it is trimmed for a hover, (FIG. 16.), while oriented into the wind, and will resist prematurely ascending. Furthermore, a maximum down-angle on the rear flap serves to force the front of the craft downward, securely into the ground, even in what would otherwise be dangerously high wind-gust conditions. Trimming for a negative angle-of-attack on the disk's nose will tend to drive the nose of the craft down. It is a maneuver that may be necessary for ground control, as well as landing in excessively high winds, but it is also a flight-surface configuration with safety risks if it is used improperly, because the nose-down flap position is capable of overriding the air-vehicle's built-in trim for a slow vertical descent. This air-vehicle invention anticipates rear trim-flaps 24 that are aerodynamically blended into the outer surface of the rotor-duct, as well as boom-mounted flaps that are located with a space between the duct and flap. Flaps may be flat, upwardly curving, tapering, or airfoil in cross-section, with a planform generally less than ½ in area that of the disk, and a size of about $1/5^{th}$ of the disk in area having worked well experimentally. Construction of the trip-flap is lightweight, rigid or semi rigid, with material options including; composite, tube and fabric, wood and fabric, etc.

Optional Equipment—All Embodiments: (FIGS. 1.-4. Illustrated)

Sliding/Tilting Seat and Harness, (FIGS. 1.-4.). This optional device may be equipped on embodiments where weight-shift control is operated in conjunction with control-surface control in a coordinated manner. This option would provide the most benefit to beginners and inexperienced, casual users. Separate control-surface controls, which are independently operated and not connected to the weight-shift system, in the hands of experienced operators provide more options in terms of the range of the vehicle's attitudes that are possible, thereby expanding the air-vehicle's overall performance envelope.

Sliding Seat for a 2-Seat Embodiment of Air Vehicle: (FIGS. 1.-4. Illustrated)

While this invention is intended to be controlled from a standing position, as when a cross-country bicyclist stands on the pedals to do sharp turns, a seat is also provided, for comfort on long stretches of straight-and-level flight, such as cross-country flying. The seat is readily available, placed just below crotch level. Normally, a fixed, long, 'banana', or saddle-type seat will accommodate the pilot wherever the pilot is placing his or her weight, and need not be slidable in respect to the fuselage. Any two-person embodiment however, where the passenger takes a position tandem to, and to the rear of the pilot, as it is essential not to divide the weight-balancing mass during maneuvers while the pilot is moving his or her position relative to the craft. For this reason, the passenger's mass is slaved to the pilot, by harnessing both individuals to the same sliding, or moveable seat. A simple rail, bogey-wheel, and hanger arrangement provides the sliding gear, which supports the padded 2-place seat. The seat is lightly spring-loaded, so as to return the balancing mass, d. (pilot, passenger, and/or payload) to a default, or "at-rest" position in relation to the rest of the aircraft. This automatically balances the craft for an optimum vertical unpowered descent, and is of benefit in those rare instances where the pilot is incapacitated and therefore unable to assume the optimum position by him-or-her-self.

A side-to-side tilting mechanism may be optionally added to the seat assembly to assist in positioning the passenger correctly during a tilting turn. However, this is a skill that can be rapidly learned by a passenger, simply by "following", or mimicking the pilot's position as he leans into a turn, and so is not a necessary device for correct operation of a 2-place vehicle. Such a tilt-mechanism would, however, serve to help train a student pilot who is occupying the rear position.

Optional Additional Aerodynamic Control Regimes: (FIG. 18.)

In its simplest form, both major embodiments configure a rotor disk and at least one pair of descent-vanes, at a fixed, non-movable angle. Whatever angle is chosen is necessarily a compromise between that angle which obtains the least drag and best vane-lift during forward flight, vs.: the angle which produces the best aerodynamic balance for a stall-less, slow, un-powered vertical or near-vertical descent.

Variable-Geometry Control Option: (FIGS. 16., 17.)

In embodiments having a fixed non-movable descent-vanes the angle chosen between the descent-vanes and the fuselage is a compromise between maximum forward top-speed vs. slowest vertical descent rate, and which leans towards the benefit of safety, as it is the claim of a safe, slow descent that is the essence of this invention. The angle will be selected that best achieves the slowest un-powered descent, when the pilot is in the default or "at-rest" balancing position. However, the invention anticipates a desire for increased performance, with the addition of a mechanism to alter the vanes' angle, or the disks' angle. In fact, increased performance can be provided without sacrificing safety, but the additional control inputs require greater training and experience on the part of the pilot.

Optional High-Performance Controls: (FIGS 16., 17.)

One means of altering the rotor-disk/descent vane angle of incidence is by means of a pivot, 21, (FIG. 16.) attaching the descent-vane assembly, controlled from the fuselage area by an overhead handle-bar, or trapeze-bar, 20. Another method is to mount the fuselage, b, rotatably to the rotor-disk by a pivot or rocker and axle assembly, 21. Either system permits the pilot to increase this angle, while simultaneously weight-shifting forward, for high-speed forward flight, or flattening the angle while weight-shifting to the rear, to trim for vertical, un-powered descents. Either system may optionally added to all of the Embodiments of this invention.

Preferred Embodiment—Descent Characteristics:

Stall-speeds for Rogallo-wings and swept-back hang-glider type wings depicted on the Preferred Embodiment are typically about 15-20 kph. However, experimentally, the addition of the second aerodynamic element, the rotor-disk, further lowers the stall-speed up to 50%. Furthermore, the typically sharp "lift and dip" stall of most fixed-wing aircraft is modified in this two-element system to a gentle: mushing" effect, where the nose does not sharply rise and then fall-away, but the entire craft remains level and begins a gradual descent. Being level, the vehicle remains stable and controllable about both the pitch, or lateral axis, as well as the roll, or horizontal axis. In air vehicles with similar geometry, such as the "canard" and "tandem-wing" types, this highly modified stall characteristic has been referred to as "stall-less". It is expected that, during most emergency un-powered descents, the pilot will opt for an extended, 1:3 or 1:4 glide, which gives a very slow descent rate on the order of 1 to 1.5 meters-per-second. If a completely vertical un-powered descent must be attempted, the pilot will experience a higher sink-rate, on the order of a sport-parachute, at about 2 meters per second. Only in the most extreme circumstances, where not only is auto-rotation of the rotor unavailable, but there is also substantial damage to a portion of the louver-vanes of the disk, will a critically high descent rate be experienced during a completely vertical descent. A low sink-rate glides can still be undertaken, but if a vertical descent is the only option, in this condition (a severely damaged disk) an impact of 3 or 4 meters per second will be experienced. Such an impact will still be survivable in almost any conceivable circumstances, although minor injuries and damage to the vehicle may be expected. Gross physical damage to either the disk or the vanes is the only condition that would impair a vertical un-powered descent. Any un powered descent in which the vanes remain undamaged, and the rotor continues to auto-rotate, will be a soft, parachute-type landing, regardless of how much or how little forward airspeed the pilot has selected for.

Alternate Embodiment—Descent Characteristics: (FIGS. 2.a, 2.b)

The AE is restricted to the use of a single type of descent-vanes, c.i & c.ii—the long, narrow-chorded vane is the only form that can be conveniently placed alongside the fuselage. The left and right vanes together create a Rogallo-shaped, or dart-shaped planform, which exhibit the same basic gliding and vertical descent characteristics as for the PE, described in the preceding paragraph.

General Performance Characteristics: (FIGS. 1., 2.a, 2.b)

To date, most data regarding this air-vehicle invention has been extrapolated from experimental observation of models of about $1/12^{th}$ scale. Observation of independently-tested components at full-size, or human-scale, have also been incorporated into conceptual models of expected performance for a full-size air-vehicle. All of the embodiments fly in accordance with known theory in all phases, including; gliding and vertical, power-off landings, hovering flight, & powered forward flight.

Because the configuration is a new one, with no prior art found to draw on, it may remain in the 'experimental' stage for some time. Therefore next-stage designs will likely exceed the performance estimates given here. The fabric-canopy Paraglider embodiment, (FIG. 3.) and a Kite-Biplane embodiment having flat-panel, bi-plane descent-vanes, (FIG. 4.) are likely to be unwieldy on the ground in winds over 20-25 kph, and they have an estimated top speed of only about 80-85 kph. Nevertheless, any of the embodiments, constructed according to this description, will fly and hover with full control, and with sufficient lifting capacity, fuel capacity, and speed so to be of utility as a mode of personal transportation. The lower-performance embodiments may prove the more popular for recreational use, being rugged, easy-to-learn, and the least expensive. The Alternate Embodiment (FIGS. 2.a, 2.b) has the most utility, and is expected to produce the best top-speed and carrying capacity performance, and the most effective control. The Preferred Embodiment (FIG. 1) has the greatest capacity for pure gliding. Some prior art flying-wings of good gliding performance are known to have a "stall-less" characteristic typified by a slow decent rate and a descent that is vertical or nearly vertical. Powered by increasingly efficient lifting-disk propulsion, all of the embodiments of this air-vehicle invention are capable of precisely controlled hovering flight, comfortable long-range cross-country capability, soaring at altitude, and possibly, aerobatics.

Propulsion-Types of Motor/Rotor Combinations in the Art: (FIGS. 6., 7., 8., 12)

At this time, a 2-cycle gas engine is considered the most reliable and cost-efficient for this air-vehicle invention. Aero-quality jet-turbines as well as electric power plants may become acceptable alternatives. While the surrounding duct, or shroud, 11 (FIG. 7.) is not an essential lift-vector, its weight penalty is more than offset by increased propulsion it produces. A shroud is built up from structural foam with re-enforcing elements, and hard-points for connection to other structural members. The duct, or shroud, provides structure, to which a rounded edge—a molding or panel—is attached, providing a fixed, non-rotating "bumper" for protection against outside obstacles whilst on or near the ground, (continued next page . . . ) and providing an aerodynamically active surface in flight. The duct is secured at the inlet by means of lightweight, elongated members or spokes, 8 (FIGS. 6.) and 12 (FIG. 7.) connecting the edge of the duct to a central hub. At the outlet similar spokes connect at a central hub, which is fastened to at least one structural fuselage b. member. The central location of the interior of the duct is occupied by a 2-cycle aero-motor 5, rotatably secured to the fuselage. The motor may optionally be equipped with a streamlining shroud 9, and a central spinner. Experimentally, man-carrying flying platforms from 5 ft. to 10 ft. diameter have been successfully flown. To compensate for smaller rotor blade size, blades have tended to be wider-chorded, slower optimum speed, high-camber, high-lift types, with several examples in the art tending towards greater numbers of blades. The result is more fan-like than propeller or rotor-like. The object of safety, however, requires the capability of the outer blades, at least, to auto-rotate, to contribute a lifting vector during un-powered descents. The additional space required to mount extended, leading-edge, blade-tip weights, required for auto-rotation, gives a practical limitation to the number of blades that can be fitted. The weights are located below the plane of the rotor and are activated by centrifugal force in an upwards direction, bringing the rotor to a positive angle-of-incidence for normal flight. Upon loss of power, wind-milling rotor-blades lose momentum, so that the tip-weights rotate the blade to a small, approximately 4 or 5 degress negative angle-of-incidence, for an auto-rotating glide.

Torque-less rotor systems are preferred over single-rotor systems, but the typical co-axial type of torque-less rotor will lose efficiency by virtue of the blade-disks being too closely spaced, in order to keep the thickness/diameter ratio proportional. The down thrust has a small horizontal component which is partially diffused by the effect of radially-mounted re-directing louver-vanes, f.15 & f.16 (FIGS. 7., 9.). These airfoil-section vanes may serve the dual function of swinging to a horizontal position during an unpowered descent, thereby partially occluding the outlet, or inlet and outlet, of the duct, while leaving sufficient openings so that up-rushing air activates auto-rotation of the blades. During powered flight, the louver-vanes are retained by simple mechanical stops, at a predetermined angle so that the upper, or leading edge, has a negative angle of attack of between −2 and −8 degrees, depending on the airfoil section chosen. The vane then acts like a "tacking", or "upwind" sail, and contributes a modest lift vector. A second multiplicity of vanes, f.13 & f.14 arrayed radially on top, at the inlet, and at the bottom outlet, collectively contribute a significant additional amount of lift.

A gear transmission system, used to transmit power from a single driveshaft, in equal proportions, to two separate driveshafts, with one driveshaft rotating inside a second, hollow, or tubular, driveshaft, and in the opposite rotation to the outer driveshaft, is well-known in the art. In this air-vehicle invention, the object of safety requires auto-rotatable rotor blades, which requires the addition of a cogged, one-way, wind-milling mechanism, or alternatively, an automatic clutch of the centrifugal-clutch type, mounted on the engine-output shaft, and acting upon the transmission-input shaft. Each of the two output shafts terminate in flanged hubs, onto which the propeller and rotor-blade struts are mounted.

Propulsion—"Dual-Vortex Ring" & Contra-Rotating Rotor: (FIGS. 5., 6.)

Besides single-rotor and dual, contra-rotating rotors of conventional design, all embodiments of my invention may optionally be equipped with the "dual-vortex" rotor system. This is another invention of mine, for which a patent application is currently in-progress, and which describes a "Dual Vortex" rotor system, and consist of a device of the art comprising an aero-motor, 5, rotatably attached to the fuselage by means of a bearing, or sleeve, 1 and a rotatable mounting shaft-and-hub, 2, with the motor centrally located and rotationally balanced upon the hub. One single-place embodiment of this air-vehicle invention has a 1-meter multi-bladed propeller, 6, attached to the motor's driveshaft, either directly or through an in-line reduction transmission. Mounted radially to the motor/hub assembly are multiple, evenly spaced elongated members, or struts, 3, upon which auto-rotatable rotor-blades are mounted. This second, or outer-rotor set, 4 creates a disk approximately 3 meters diameter, and rotate in the opposite direction of the propeller, through the action of torque. The outer blades are truncated at their root so as to create 2, concentrically-arranged disks, that are brought into line, approximately, along the plane of the disks. This device has appeared in the art in the form of flying model helicopters and flying toys, and has proved a satisfactory means of obtaining additional propulsion of about 20% more lift through harnessing of engine torque. Further gains, on the order of 20-30% more than a conventional rotor of equivalent power, are achieved through the application of the dual-vortex effect, combined with an additional lift-vector from the louver-vane, 'lifting-shell' assembly. While aerodynamically complex, the torque-less, dual-vortex lifting disk is mechanically very simple. The relatively small, low-power 2-cycle engines operate normally when rotating at the required rpm.

In my "dual-vortex" invention, modifications include adding a substantial an-hedral applied to the outer rotor-blades, 4. Added to the assembly, and affixed firmly to the supporting fuselage member by means of radial spokes 8, is a venturi-shaped duct-ring 7 (FIG. 6) of a special aspect, to be described. This ring is placed between the two rotors. Also added to the assembly is a streamlined cowl, 9 surrounding the motor or a portion of it, as a means of occupying the central region of the throat & modifying the down thrust into a skirt-shaped form, that has an annular cross-section. FIG. 7. includes an expanded view of the inner-duct, 7, in section, showing an extended "lip", or curvature, 7.$ii$, formed from the outer-edge of the duct, which; 1) collects an additional volume of 'surface-friction' air for delivery to the throat of the duct, and, 2) use the Coanda Effect to create an area of low pressure, or lift, along the curved top surface, 7.$ii$. The throat of the duct, 7.$i$ narrows, before following a parabolic curve, 7.$vi$ and then an flair, 7.$vi$—angled outward to widen the outlet of the duct. A small, sharp ridge, or spoiler, 7.$v$ extends around the inside circumference of the throat at or neat the outlet, to provide for the clean aerodynamic separation of the down thrust from the duct. The shape of this duct, and the pre-determined angle at which the outlet of the duct is formed, are for the purpose of re-directing the down-thrust from a near-vertical orientation, to a more outward flow, taking the form of a flaired skirt. Resistance provided by this skirt-shaped accelerated air-flow provides a means whereby the down thrust from the outer set of rotors, 4 meeting it at an approx. 10-40 degree angle and in a counter-rotating state, produces a gain in thrust. The outlet of the outer annular thrust-plenum, demarked by its spoiler-ring, 7.$v$, is below that of the inner—a geometry which achieved the best thrust. Thus, a lift gain as well as a torque-gain is realized.

As with the conventional counter-rotating system, a duct 11 (FIG. 7.) may also be optionally placed around the main outer rotors, for improved performance and for safety purposes. In the dual-vortex" system, the two ducts are fastened together with a "birdcage" arrangement of spokes, 8 (FIG. 6.) & 12 (FIG. 7.) onto which the rotatable louver-vanes f. may be optionally attached as a descent-arresting device. The upper and lower surfaces of the disk-shell thus created each have two sets of louver-vanes; one for the outer rotors and oriented in the opposite direction of rotation of its activating rotors, 4 and another set located above and below the inner duct-opening, and oriented in the opposite direction of its rotor's, 6 rotation.

In summary, the "dual-vortex" system harnesses torque that would otherwise have to be corrected-for, with a commensurate power-gain. It obtains a further propulsive gain by re-directing 2 concentric thrust-plenums into opposition, in a predetermined geometric form, thus deriving a reactive push. The outer rotor blades are freewheeling, are rotatable along their span, and equipped with leading-edge tip-weights to enable auto-rotation.

Other variants and species of the "dual-vortex" system exist which are equally suited as a propulsive means for this air-vehicle. A Utility patent application is currently being prepared for this device, for expected submission in March, 2010.

Conclusions, Ramifications, and Scope of the Invention:
Special Note Re: Essential Elements of Preferred and Alternate Embodiments: (FIGS. 1., 2.a., 2.b., 6., 7.)

Although the Preferred Embodiment (PE) (FIG. 1) and the Alternate Embodiments (AE) (FIGS. 2.a and 2.b) have a superficial dissimilarity—the descent vanes and lifting-disk are located in apposite places—they are essentially the same vehicle. The only point of difference in the relative Means of Operation between the two is that, during normal powered flight the AE's descent-vanes, c.i & c.ii (FIG. 2.a.) derived an amount of addition lift from the down thrust of the rotor. In normal powered flight the PE's descent-vanes derive an amount of additional lift from forward motion into the ambient airflow. I opined that this particular difference between respective methods-of-operation is of a secondary nature, insufficient to require the Alternate Embodiments and Further Embodiments be filed as a separate species of device. Because of an absence of prior-art, my inclination was that the essential novelty of this air-vehicle invention lies in the co-joining of a horizontally-arranged lifting rotor, with a tandem arrangement of wing-like appendages, or Descent Vanes—resulting in an air-vehicle that is aerodynamically stable and controllable in both its powered, vertical or forward flight modes—and in its unpowered vertical descent and unpowered gliding-descent modes.

While there are only three main elements—two active ones: descent vanes, c.i & c.ii, and lifting rotor, a., and one connecting element, or fuselage, b.—there are nearly infinite possible permutations of their arrangement together. Of these, only two basic configurations—Alternate Embodiment, or 'helicopter-type', and the Preferred Embodiment, or 'flying-platform type', can be readily made to work aerodynamically in both powered and un-powered modes. Each are successfully balanced by means of creating an offset between two aerodynamic elements, with the rotor disk comprising one of these elements. Such a tandem arrangement becomes more stable and controllable about the lateral, or pitch-axis. The disk, 11 (FIG. 7.), is made more aerodynamic in forward flight by means of a rounded perimeter. In descent, additional resistance is provided by means of auto-rotating outer-rotors 4, as well as radially-arranged rotatable louver-vanes, f.13-f.16 (FIG. 1., 2.a, 2.b, 7.) making up the top and bottom surfaces of the disk. Whether the lifting disk is located at the top or bottom of the aircraft, its tandem arrangement provides stability and permits the used of descent panels somewhat smaller than if the descent-vanes were being relied upon solely. The disk-forward tandem arrangement is beneficial for forward flight by providing additional lift. The disk is set at a negative angle of attack, relative to the "vertical-descent best angle" of the descent-vane, so that the axes of the centers-of-pressure of two elements are juxtaposed at an angle to each-other and providing stability by 'toeing-in'. In this way, stalls are avoided—replaced by a "mushing" transition into a vertical "parachute" descent. The tandem arrangement creates the system in which, in combination with the weight-shift control system, one massive element—the payload, or occupant, d. (FIG. 1.) is offset to the fore of the disk's centre, to provide a counterweight to the other massive element, the descent-vane panels c.i and cii., which are arrayed predominantly to the rear. These two systems—the weight-shift control and the tandem aerodynamic elements, are trimmed to mirror one-another, operating synergistically so that the natural intuitive body movements results in movement of control surfaces, for coordinated movement in any direction chosen. Thus, the essence of my invention is the co-joining of a tandem, "bi-plane" arrangement, of a motorized, horizontally-mounted rotor-disk, providing lift for ascent, and for unpowered descent through auto-rotation, together with a set of descent-vanes that are engaged with the airflow, and are permanently extended and available full-time. These two elements are aerodynamically arranged in their angles of attack, etc, to produce desired benefits in particular modes of flight, and those modes are easily and naturally selected by the pilot through his or her intuitive body-motions, which is transferred through weight-shifting into attitude-control of the vehicle. Good control can be had from weight-shift alone, but superior performance during forward flight results from the addition of control surfaces such as elevons 23 (FIG. 22.) rudder g. (FIG. 2.a) flap 24 (FIG. 16.), etc. These may be connected to the pilots' seat/harness so that weight-shifting and aerodynamically-controlled attitude movements are coordinated.

Other Embodiments: Preferred Embodiment having a Fabric Panel Descent-Vane (Semi-Rigid Canopy-Wing), Further Description: (FIG. 3.)

Besides the two main types—the platform-type Preferred Embodiment, and the helicopter-style Alternate Embodiment, other embodiments include a PE-style air-vehicle, where the wing is a semi-rigid frame, i supporting a fabric canopy, whereby a co-joined left-half and right-half of a cellular canopy c.i & c.ii is positioned above the fuselage by means of struts h.i, h.ii, & h.x instead of conventional parachute cords. It operates in the way described for the PE, except will be somewhat slower than a Rogallo or delta-wing type in forward flight because of its higher drag quotient. The advantage is that it is a very stable configuration and, importantly, it has the appearance of stability and safety, and so may be more acceptable to prospective first-time operators.

Other Embodiments—Tandem-Wing: (FIG. 4.)

A diamond, or box-shaped joined-wing, such as U.S. Pat. No. 5,899,410, "Aerodynamic Body Having Co-planar Joined Wings" is a tandem configuration, in the above instance one having variable-geometry wings, which are slidably mounted on the fuselage. The geometrical arrangement itself, however, has long been noted for its attributes of a lighter and stiffer construction, and having both high and low-speed performance benefits. The original tandem-wing homebuilt, the French "Flying Flea" employed highly-cambered wings and was noted for controllable descents that were almost vertical, and an extremely short take-off run. This embodiment also employs a tandem-arrangement, where the rear vanes j.i & j.ii have a substantial dihedral and the front vanes c.i & c.ii have a substantial anhedral, thereby bringing the tips into closer alignment, and connected, front to back, by short diagonal braces, or connecting struts h.i & h.ii. These struts supply structural strength and may be used to optionally mount a vertical planar member, or stabilizer fin, to which may optionally be added a (continued . . . ) second planar member, or rudder, mounted on hinges and controlled through cables for control about the vertical, or spin axis. The tandem descent-vane appendages of this embodiment may also take the Rogallo form, whereby flat cloth panels, secured to a rigid triangular frame, are inflated into an upward convex during descent. This embodiment is well balanced and, as with the "parachute-wing" embodiment, brings a psychological benefit, in that the descent appendages substantially surrounds the pilot, and gives the appearance as well as the fact, of enabling slow, safe descents.

Conclusions, Ramifications, and Scope, Summary:

Thus, it can be seen that relatively safe vertical flight is achieved by combining three element; a lifting-rotor, and an appendage of descent-vanes, both connected, in a tandem, bi-plane arrangement, by a fuselage. A simple system of weight-shift control serves to control the vehicle in both hovering flight and in forward flight, although a variety of control-surface controls may optionally be installed to improve performance.

The air-vehicle is safe for human operators by virtue of the descent-vanes, which remain operational at all times, ready to provide a slow, gliding or parachute-like vertical descent, should the main propulsion system fail. Propulsion systems, being mechanical, will fail eventually—it may be as simple as just "running-out-of-gas". This invention overcomes the actual danger of this potentiality, and also overcomes the psychological apprehension of mechanical failure, thereby making this invention more readily accessible to larger numbers of potential recreational fliers.

Sport-Model: (FIG. 18.)

This air-vehicle invention anticipates a wide range of size scales; For operations involving humans, a full-size, 2-person version will have a disk diameter of approximately 3 meters and the descent-vanes will generally have a span of 6 or 7 meters. However, a "sports model" is anticipated, for use in windy conditions such as those encountered along a shoreline, or along a ridge-line (ridge-soaring). Where high constant adriabatic winds are encountered, a diminutive Preferred Embodiment Invention, (FIG. 18.) having a descent-vane span of only 4 meters, and a rotor diameter of 1½ or 2 meters, will provide sufficient lift for free-flight, and for relatively safe gliding descents. Man-operated air-vehicles of this size will require only 10-20 hp motors—making the "sport" variant an exceptionally inexpensive approach to experiencing personal flight. However, the larger "Safety-Flier" embodiment of the air-vehicle is more stable and relatively easy to operate, on the order of a watercraft, motorcycle, snow-craft, or even a bicycle. Physical requirements include general health, 20/20 eye-sight, & sufficient strength of limb to manipulate the attitude of airframes of approximately 80-200 kg. But, while learning to fly a regular "Safety-Flier" embodiment will not require excessive physical ability, some embodiments do anticipate "sports models", that expands the performance envelope in terms of forward level flight and vertical-climb-rate, diving or never-exceed speed, (continued . . . ) maneuverability, stress levels on the airframe, and so on. This evolution has the potential for fast, nimble air-vehicles, piloted by professional athlete-pilots, for specialized applications of my invention, such as air-racing, aerobatics, etc. Some variants are expected to develop such advanced performance and exotic aspect that they bare little resemblance to the "Safety-Flier" of the current air-vehicle embodiments (FIGS. 1.-4.) shown in this patent. The common element of all present and future embodiments is the ability of a descent-vane-equipped air-vehicle to be flown safely, without power, from any altitude to the ground, in a vertical or near-vertical descent. Some embodiments, designed for higher performance, have relatively higher landing speeds requiring a higher levels of training and athleticism of the pilot. The practical upper limit for all weight-shift embodiments is similar to that of existing classes of ultralight aircraft. A pilot, passenger, and a compact payload or cargo, possibly including a child-seat, is the practical maximum. A sufficiently powerful motor might propel a small transport embodiment, made capable of carrying cargo or several personnel with the addition of a system of mechanical or hydraulic leverage to augment weight-shift control. The practical upper size-limit for embodiments so equipped is a function of the area of descent-vanes required, with the commensurate limitation of the smaller number of large-size landing-areas that are available to such a vehicle. Descent-vanes of 10 meters or more will adequately transport small cargoes, but will require landing-zones of an estimated 400-800 square meters for un-powered landings. The upper-size limit has not been explored; embodiments shown in this patent should not be construed as limitations as to the possible scaling of the largest and the smallest future embodiments of this air-vehicle invention.

Glider Version:

A motor-less "glider" version of this air-vehicle invention is also anticipated. The main rotor can be made to auto-rotate, whether or not a motor is installed. With the main rotor-blades, 4 set at a slight negative angle-of-attack, they rotate and generate lift whenever they are activated by air pressure from below. This occurs during any descent, and also when the vehicle is towed, with its forward motion activating the rotor blades. This tow-able variant is capable of flying as high as the tow-line permits, is directionally controllable, and has the same "safe" gliding-descent characteristics of the motorized version. The gliding, or "tow-able" embodiment of this air-vehicle is expected to be useful as a training craft as well as providing pleasure-rides.

Micro-Flier Version:

While the weight-shift control embodiment of this air-vehicle has a natural upper size limit of a 2 or 3-person carrying capacity—miniature, centimeter-size and larger embodiments are anticipated as platforms for surveillance equipment, ordnance, etc. These pilot-less embodiments may also operate on the principle of weight-shift control, except in this case the mass that is being shifted, relative to the air-vehicle, is not a pilot but other payload. The payload may be comprised of fuel or batteries, electronics, etc. The pilot-less embodiment is equipped with a signal-receiver, for remote guidance, and a controller, or servo-mechanism, to physically re-position the payload for weight-shifting control of the vehicle. A link-arm connects the payload slidably to the servo-and-fuselage, to effect movement of the payload.

While my above description contains many specificities, these should not be construed as limitations on the scope of the invention, but rather as an exemplification of a Preferred and an Alternate Embodiment thereof. Many other variations are possible. For example, besides the Preferred and Alternate Embodiments, an Additional Embodiment incorporates a "tandem-wing" (FIG. 4.) or "Tandem-vane" arrangement, in which a pair of descent vanes is positioned to the fore of the fuselage, and a second pair to the aft, resulting in an exceptionally stable craft which has slightly different flying performance from the other embodiments. The tandem-vane embodiment anticipates a variety of multi-vane configurations, as well as "joined-wing" or "joined-vane" style, and "circular-wing" or "circular-vane" style. Both of the latter join the front lifting/resistance surfaces contiguously to the rear ones, creating a single element which is suspended above the fuselage and supported by struts, and performs the same function as a single set of descent-vanes, essentially: to provide a slow, gliding and parachute-like descent in the event of engine or rotor failure.

Accordingly, the scope of the invention should be determined not by the embodiments illustrated, but by the appended claims and their legal equivalents.

Thus it can be seen that this air-vehicle invention reliably provides a means of a slow, safe vertical landing, notwithstanding a catastrophic failure of the primary propulsion system, while enabling a means of highly controllable flight in three dimensions, thus providing an experience of sufficient safety and ease-of-use as to be accessible to an average recreational user. The vehicle combines the ability to land like a parachute, thereby enabling flight over most geographic areas without fear of mechanical failure of the motor, rotor, or any part of the primary propulsion system. While in normal, powered flight mode, the descent-vanes contribute lift in a manner similar to fixed-wing aircraft, thus enabling economical, long-range flight with much improved performance over conventional rotor-driven VToL aircraft.

Thus it can be seen that this air-vehicle invention provides a means of vertical flight, suitable for taking-off and landing from an average "back-yard", which is easy to learn, relatively inexpensive (approximately equivalent of a medium-price motorcycle to manufacture) and above all, is safe. Safety is regarded as the key to opening the door to widespread, popular personal flying. This invention, incorporating all the benefits of a "flying parachute" satisfies the requirement for safety in a VToL air-vehicle.

The invention claimed is:

1. A vertical takeoff and landing air vehicle comprising:
   at least one vertical pylon;
   a platform for a payload connected to one end of the vertical pylon;
   landing gear attached to the outer duct;
   an outer duct; and
   a lifting rotor disk assembly comprising:
      a motor;
      a central hub assembly;
      at least one propeller driven by the motor;
      at least two sets of louver vanes mounted above and below the at least one propeller;
      wherein the lifting rotor disk assembly is connected to the platform by a plurality of connecting struts such that the platform is mounted on top of the lifting rotor disk assembly and forwardly offset from the center of the lifting rotor disk assembly; and
   at least one descent vane attached to the second opposite end of the pylon comprising;
      at least two symmetrical, wing-shaped co-joined planar elements; and
      wherein the descent vane is attached to the pylon such that the center of gravity of the descent vane is substantially in line with the central axis of the lifting disk rotor assembly and the descent vane has positive angle of attack.

2. The vertical takeoff and landing air vehicle of claim 1 wherein the wing-shape of the said descent vane is a delta-wing.

* * * * *